United States Patent
Xu et al.

(10) Patent No.: US 11,486,202 B2
(45) Date of Patent: Nov. 1, 2022

(54) REAL-TIME POLYCRYSTALLINE DIAMOND COMPACT (PDC) BIT CONDITION EVALUATION USING ACOUSTIC EMISSION TECHNOLOGY DURING DOWNHOLE DRILLING

(71) Applicant: SAUDI ARABIAN OIL COMPANY, Dhahran (SA)

(72) Inventors: Jianhui Xu, Dhahran (SA); Guodong Zhan, Dhahran (SA); Bodong Li, Dhahran (SA); Chinthaka P. Gooneratne, Dhahran (SA); Arturo Magana Mora, Dhahran (SA); Timothy Eric Moellendick, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 11 days.

(21) Appl. No.: 17/187,703

(22) Filed: Feb. 26, 2021

(65) Prior Publication Data

US 2022/0275687 A1 Sep. 1, 2022

(51) Int. Cl.
*E21B 12/02* (2006.01)
*E21B 10/42* (2006.01)
(Continued)

(52) U.S. Cl.
CPC .............. *E21B 12/02* (2013.01); *E21B 10/42* (2013.01); *E21B 47/07* (2020.05); *G01H 17/00* (2013.01);
(Continued)

(58) Field of Classification Search
CPC .......... E21B 12/02; E21B 10/42; E21B 47/07; E21B 47/013; E21B 47/12; G01H 17/00;
(Continued)

(56) References Cited

U.S. PATENT DOCUMENTS

| 4,658,245 A | 4/1987 | Dye et al. |
| 5,813,480 A | 9/1998 | Zaleski, Jr. et al. |

(Continued)

FOREIGN PATENT DOCUMENTS

| CN | 103529128 B | 9/2016 |
| CN | 104723171 B | 2/2017 |

(Continued)

OTHER PUBLICATIONS

Chuluunbat, Turbadrakh et al., "Acoustic Emission Monitoring of Fracture Tests"; Advanced Engineering Testing; Chapter 2; pp. 23-43; Oct. 24, 2018 (21 pages).

(Continued)

*Primary Examiner* — Daniel P Stephenson
(74) *Attorney, Agent, or Firm* — Osha Bergman Watanabe & Burton LLP

(57) ABSTRACT

A drilling tool for drilling a wellbore in a formation, where the drilling tool includes: a drill bit comprising a cutting element, a sensor array, and a controller. The sensor array includes: an acoustic emissions (AE) sensor configured to measure an acoustic signal generated during drilling of the formation by the cutting element and a load sensor configured to measure an applied load by the cutting element on the formation. The controller is communicably connected to the sensor array and configured to determine a toughness of the cutting element using the acoustic signal, the applied load, and a wear state.

20 Claims, 10 Drawing Sheets

(51) Int. Cl.

| | |
|---|---|
| *E21B 47/07* | (2012.01) |
| *G01H 17/00* | (2006.01) |
| *G01L 5/00* | (2006.01) |
| *G01N 29/14* | (2006.01) |
| *G01K 13/00* | (2021.01) |
| *G06T 7/00* | (2017.01) |
| *E21B 47/013* | (2012.01) |
| *E21B 47/12* | (2012.01) |

(52) U.S. Cl.
CPC ............ *G01K 13/00* (2013.01); *G01L 5/0028* (2013.01); *G01N 29/14* (2013.01); *G06T 7/0004* (2013.01); *E21B 47/013* (2020.05); *E21B 47/12* (2013.01); *G06T 2207/30164* (2013.01)

(58) Field of Classification Search
CPC ..... G01K 13/00; G01L 5/0028; G06T 7/0004; G06T 2207/30164
See application file for complete search history.

(56) References Cited

U.S. PATENT DOCUMENTS

| | | | |
|---|---|---|---|
| 7,844,426 | B2 | 11/2010 | Huang |
| 8,322,217 | B2 | 12/2012 | Bellin |
| 8,397,572 | B2 | 3/2013 | Bellin |
| 8,596,124 | B2 | 12/2013 | Bellin |
| 9,037,430 | B1 | 5/2015 | Wiggins et al. |
| 9,383,304 | B2 | 7/2016 | Gledhill et al. |
| 10,031,056 | B2 | 7/2018 | Bellin |
| 10,605,783 | B2 | 3/2020 | Zalameda et al. |
| 11,111,732 | B2 * | 9/2021 | Zhan ........................ E21B 44/00 |
| 2003/0194946 | A1 | 10/2003 | Malkin et al. |
| 2007/0185696 | A1 | 8/2007 | Moran et al. |
| 2010/0139987 | A1 | 6/2010 | Hunt et al. |
| 2011/0239764 | A1 | 10/2011 | Bellin |
| 2012/0325564 | A1 * | 12/2012 | Vaughn ................... E21B 10/46 |
| | | | 175/428 |
| 2013/0068525 | A1 | 3/2013 | DiGiovanni |
| 2013/0166214 | A1 | 6/2013 | Bellin |
| 2014/0047776 | A1 * | 2/2014 | Scott ....................... E21B 47/01 |
| | | | 51/297 |
| 2014/0250994 | A1 | 9/2014 | Gledhill et al. |
| 2014/0326506 | A1 * | 11/2014 | DiFoggio ............... G01H 15/00 |
| | | | 175/39 |
| 2017/0037721 | A1 | 2/2017 | Lovorn et al. |
| 2017/0074833 | A1 | 3/2017 | Takamine |
| 2018/0171772 | A1 * | 6/2018 | Rodney ................... E21B 44/00 |
| 2018/0231444 | A1 | 8/2018 | Bellin |
| 2019/0100993 | A1 * | 4/2019 | Sullivan .................. E21B 47/01 |
| 2020/0095831 | A1 | 3/2020 | Etebu et al. |
| 2020/0149354 | A1 | 5/2020 | Singh et al. |
| 2021/0032936 | A1 * | 2/2021 | Zhan ........................ E21B 12/02 |
| 2021/0048382 | A1 * | 2/2021 | Badri ....................... G01N 3/46 |

FOREIGN PATENT DOCUMENTS

| | | |
|---|---|---|
| CN | 206855141 U | 1/2018 |
| CN | 108760361 A | 11/2018 |
| CN | 109623655 A | 4/2019 |
| CN | 107584334 B | 5/2019 |
| CN | 209466035 U | 10/2019 |
| CN | 108490880 B | 1/2020 |
| CN | 111331429 A | 6/2020 |
| EP | 2 347 287 B1 | 7/2017 |
| JP | S60-152951 A | 8/1985 |
| JP | 2017-157234 A | 9/2017 |
| RU | 2 549 914 C2 | 5/2015 |
| WO | 2009/086279 A2 | 7/2009 |
| WO | 2013/074765 A2 | 5/2013 |
| WO | 2015/002617 A1 | 1/2015 |
| WO | 2017/163201 A1 | 9/2017 |
| WO | 2019/028269 A2 | 2/2019 |
| WO | 2021/021598 A1 | 2/2021 |
| WO | 2021/022042 A1 | 2/2021 |

OTHER PUBLICATIONS

Xiao, J.J. et al., "Intelligent Distributed Acoustic Sensing for In-well Monitoring"; Proceedings of the SPE Saudi Arabia Section Technical Symposium and Exhibition; Paper No. SPE-172197-MS; pp. 1-12; Apr. 21-24, 2014 (12 pages).

Molenaar, M.M. et al., "First Downhole Application of Distributed Acoustic Sensing (DAS) for Hydraulic Fracturing Monitoring and Diagnostics"; Proceedings of the SPE Hydraulic Fracturing Technology Conference and Exhibition; Paper No. SPE-140561-MS; pp. 1-9; Jan. 24-26, 2011 (9 pages).

Seemuang, Nopparat, "Non-destructive Evaluation and Condition Monitoring of Tool Wear"; Thesis submitted to the University of Sheffield in partial fulfillment of the requirements for the degree of Doctor of Philosophy; pp. i-267; Apr. 2016 (283 pages).

Rastegaev, Igor et al., "A Time-Frequency Based Approach for Acoustic Emission Assessment of Sliding Wear" MDPI Open Access Journals: Lubricants; vol. 8, Issue 5: 52; pp. 1-24; May 9, 2020 (24 pages).

Marinescu, Iulian et al., "A critical analysis of effectiveness of acoustic emission signals to detect tool and workpiece malfunctions in milling operations"; vol. 48, Issue 10; pp. 1148-1160; Aug. 2008 (13 pages).

Kuppuswamy, Ramesh et al., "Intelligent PCD Tool Testing and Prediction of Performance"; Precision Product-Process Design and Optimization; Chapter 7; pp. 161-187; Apr. 18, 2018 (27 pages).

Li, Xiaoli, "A brief review: acoustic emission method for tool wear monitoring during turning"; International Journal of Machine Tools and Manufacture; vol. 42, Issue 2; pp. 157-165; Jan. 2002 (9 pages).

Palanisamy, P. et al., "Prediction of tool wear using regression and ANN models in end-milling operation"; The International Jomal of Advanced Manufacturing Technology; vol. 37, Issues 1-2; pp. 29-41; Apr. 2008 (13 pages).

Govekar, E. et al., "Analysis of acoustic emission signals and monitoring of machining processes"; Ultrasonics; vol. 38, Issues 1-8; pp. 598-603; Mar. 2000 (6 pages).

Vetrichelvan, G. et al., "An investigation of tool wear using acoustic emission and genetic algorithm"; Journal of Vibration and Control; vol. 21, Issue 15; pp. 3061-3066; Feb. 4, 2014 (6 pages).

Raghavendra, M. J. et al., "A Study on Different Tool Condition Monitoring System Available to Monitor Tool Flank Wear"; Proceedings of the National Conference on Advances in Mechanical Engineering Science (NCAMES-2016) pp. 359-364; 2016 (6 pages).

Mohanraj, T. et al., "Tool condition monitoring techniques in milling process—a review"; Journal of Materials Research and Technology; vol. 9, Issue 1; pp. 1032-1042; Jan.-Feb. 2020 (11 pages).

Rivera-Díaz-Del-Castillo, P.E.J. et al., "Dislocation annihilation in plastic deformation: I. Multiscale irreversible thermodynamics"; Acta Materialia; vol. 60, Issues 6-7; pp. 2606-2614; Apr. 2012 (9 pages).

Carpenter, Steve H., "Acoustic Emission From Plastic Deformation"; Proceedings of the ARPA/AFML Review of Quantitative NDE; pp. 643-665; Jun. 1974-Jul. 1975 (23 pages).

International Search Report and Written Opinion of the International Searching Authority issued in corresponding International Application No. PCT/US2022/017898, dated May 11, 2022 (17 pages).

International Search Report and Written Opinion of the International Searching Authority issued in corresponding International Application No. PCT/US2022/017909, dated May 20, 2022 (14 pages).

International Search Report and Written Opinion of the International Searching Authority issued in corresponding International Application No. PCT/US2022/017913, dated May 11, 2022 (17 pages).

(56) References Cited

OTHER PUBLICATIONS

International Search Report and Written Opinion of the International Searching Authority issued in corresponding International Application No. PCT/US2022/017916, dated May 13, 2022 (18 pages).

Bhuiyan, M. S. H. et al., "Review of Sensor Applications in Tool Condition Monitoring in Machining"; Comprehensive Materials Processing; vol. 13; pp. 539-569; 2014 (32 pages).

Pontuale, G. et al., "A statistical analysis of acoustic emission signals for tool condition monitoring (TCM)" Acoustics Research Letters Online; vol. 4, Issue 1; pp. 13-18, Jan. 2003 (6 pages).

Teti, R. et al., "Advanced monitoring of machining operations"; CIRP Annals—Manufacturing Technology; vol. 59, Issue 2; pp. 717-739; 2010 (23 pages).

Aliustaoglu, Cuneyt et al., "Tool wear condition monitoring using a sensor fusion model based on fuzzy inference system"; Mechanical Systems and Signal Processing; vol. 23, Issue 2; pp. 539-546; Feb. 2009 (8 pages).

Rehorn, Adam G. et al., "State-of-the-art methods and results in tool condition monitoring: a review"; The International Journal of Advanced Manufacturing Technology; vol. 26, Issue 7-8; pp. 693-710; Oct. 2005 (18 pages).

\* cited by examiner

REAL-TIME POLYCRYSTALLINE DIAMOND COMPACT (PDC) BIT CONDITION EVALUATION USING ACOUSTIC EMISSION TECHNOLOGY DURING DOWNHOLE DRILLING

BACKGROUND

A cutting element is a tool or other implement used for separating or grinding another material. Some examples of a cutting element are a drill bit, a saw, a fly cutter, a knife, a lathe, a side cutter, a face cutter, a milling cutter, a grinding wheel, a hobbing cutter, and the plurality of cutters attached to an oil and gas drill bit, for example, a polycrystalline diamond compact (PDC) bit. A cutting element may be formed of one or more solid materials, including ceramics (for example, diamond including polycrystalline diamond compact, cemented carbides such as tungsten carbide, cubic boron nitride, aluminum oxide, silicon nitride, or SiAlONs), metals (for example, tool steel, high-speed steel, high-speed cobalt steel, cobalt, or titanium), or composites (for example, cermet). Cutting elements may also be partially or fully coated with one or more materials to change the properties of the surface. Such coating materials may include black oxide (such as magnetite), tin nitride, titanium carbonitride, titanium aluminum nitride, diamond, zirconium nitride, aluminum-chromium silicon nitride, or aluminum magnesium boride ($Al_3Mg_3B_{56}$).

It is important for many industrial processes, such as machining or oil and gas drilling, to measure and monitor the mechanical properties of a cutting element. One test frequently performed is a wear test. Wear testing involves cutting a hard material with a cutting element, measuring wear on the cutting element generated during cutting, and using the generated wear to quantify the wear resistance of the cutting element. A wear test may be performed for many reasons, including to scientifically study the properties of novel cutting tool materials, to spot-test a batch of cutting tools, or to measure the properties of a cutting tool prior to deployment such as downhole.

While wear testing is destructive, it may not always be performed to the failure of the cutting tool. Furthermore, because wear testing causes damage to the cutting element, it may be useful to measure additional properties of the cutting tool during a wear test.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a drilling tool for drilling a wellbore in a formation, where the drilling tool comprises: a drill bit comprising a cutting element, a sensor array, and a controller. The sensor array comprises: an acoustic emissions (AE) sensor configured to measure an acoustic signal generated during drilling of the formation by the cutting element and a load sensor configured to measure an applied load by the cutting element on the formation. The controller is communicably connected to the sensor array and configured to determine a toughness of the cutting element using the acoustic signal, the applied load, and a wear state.

In some embodiments, the sensor array may further comprise an AE sensor array comprised of a plurality of the AE sensors communicably connected to the controller. The plurality of the AE sensors may be configured to measure a plurality of the acoustic signals generated during the drilling.

In some embodiments, each of the plurality of the acoustic signals may be preprocessed using a preamplifier, a filter, and an amplifier communicably connected between each of the plurality of AE sensors and the controller.

In some embodiments, the AE sensor array may be configured to triangulate an origin for each acoustic feature generated during the drilling.

In some embodiments, the sensor array may further comprise a wear sensor configured to measure a wear state of the cutting element during the drilling, wherein the wear sensor is an image capture device.

In some embodiments, the sensor array may further comprise a vibration sensor communicably connected to the controller and configured to measure vibrations of the cutting element during the drilling.

In some embodiments, the sensor array may be located proximate to the cutting element.

In some embodiments, the acoustic signal may include AE generated by macroscale and microscale changes of the cutting element.

In some embodiments, at least one sensor of the sensor array may be embedded in the drill bit.

In some embodiments, the drilling tool may further comprise a plurality of the sensor arrays, where the drill bit is comprised of a plurality of drill bit arms, each of the drill bit arms having at least one of the cutting element, and where a fraction of the plurality of drill bit arms are each monitored by one of the sensor arrays.

In some embodiments, the drill bit may be comprised of a plurality of drill bit arms, each of the drill bit arms having at least one of the cutting element, where the sensor array may further comprise a plurality of the AE sensors, and where a fraction of the plurality of drill bit arms may each be monitored by one of the AE sensors.

In some embodiments, the drilling tool may further comprise a communication device configured to transfer information between the sensor array and the controller.

In some embodiments, the drilling tool may further comprise a power module configured to power the sensor array.

In some embodiments, the sensor array may further comprise a temperature sensor communicably connected to the controller and configured to measure a temperature of the cutting element during the drilling.

In one aspect, embodiments disclosed herein relate to a method for characterizing a cutting element of a drill bit while drilling a well bore in a formation. The method comprises: inserting the drill bit into the wellbore; drilling the formation using the cutting element, generating a wear state of the cutting element; measuring, during the drilling, an acoustic signal using an AE sensor and an applied load by the cutting element on the formation using a load sensor; and determining a toughness and a wear resistance of the cutting element using the acoustic signal, the applied load, and a wear state of the cutting element.

In some embodiments, the toughness and the wear resistance of the cutting element may be determined in real-time during the drilling.

In some embodiments, the method may further comprise measuring, during the drilling, the wear state of the cutting element using a wear sensor.

In some embodiments, the method may further comprise measuring, after the drilling, the wear state of the cutting element by assessing the cutting element.

In some embodiments, the method may further comprise processing the acoustic signal to remove acoustic features originating outside of the cutting element, wherein the acoustic features originating outside of the cutting element may comprise background noise and acoustic features originating in the formation.

In some embodiments, measuring may further comprise measuring a plurality of the acoustic signals using an AE sensor array comprising a plurality of the AE sensors. In some embodiments, the determining may further comprise determining the toughness and the wear resistance of the cutting element using the plurality of the acoustic signals.

In some embodiments, the method may further comprise processing the plurality of acoustic signals to remove acoustic features originating outside of the cutting element. In some embodiments, the processing may comprise triangulating an origin for each of the acoustic features generated during the drilling; and removing the acoustic features where the origin is not within the cutting element.

In some embodiments, the method may further comprise measuring, during the drilling, vibrations of the cutting element using a vibration sensor, wherein the processing the plurality of acoustic signals further uses the vibration.

In some embodiments, the method may further comprise transmitting information with a communication device in real-time from a sensor array performing the measuring in the wellbore to a controller performing the determining above a surface, wherein the sensor array comprises the AE sensor, the load sensor, and the wear sensor.

In some embodiments, measuring and determining the toughness and the wear resistance of the cutting element may be performed for each of a fraction of drill bit arms within the drill bit.

In some embodiments, the method may further comprise determining an area under a curve in a plot of the acoustic signal vs. time.

In some embodiments, the method may further comprise measuring, during the drilling, a temperature of the cutting element by a temperature sensor, wherein determining the toughness and the wear resistance further comprises monitoring for a phase transformation of the cutting element using the temperature.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
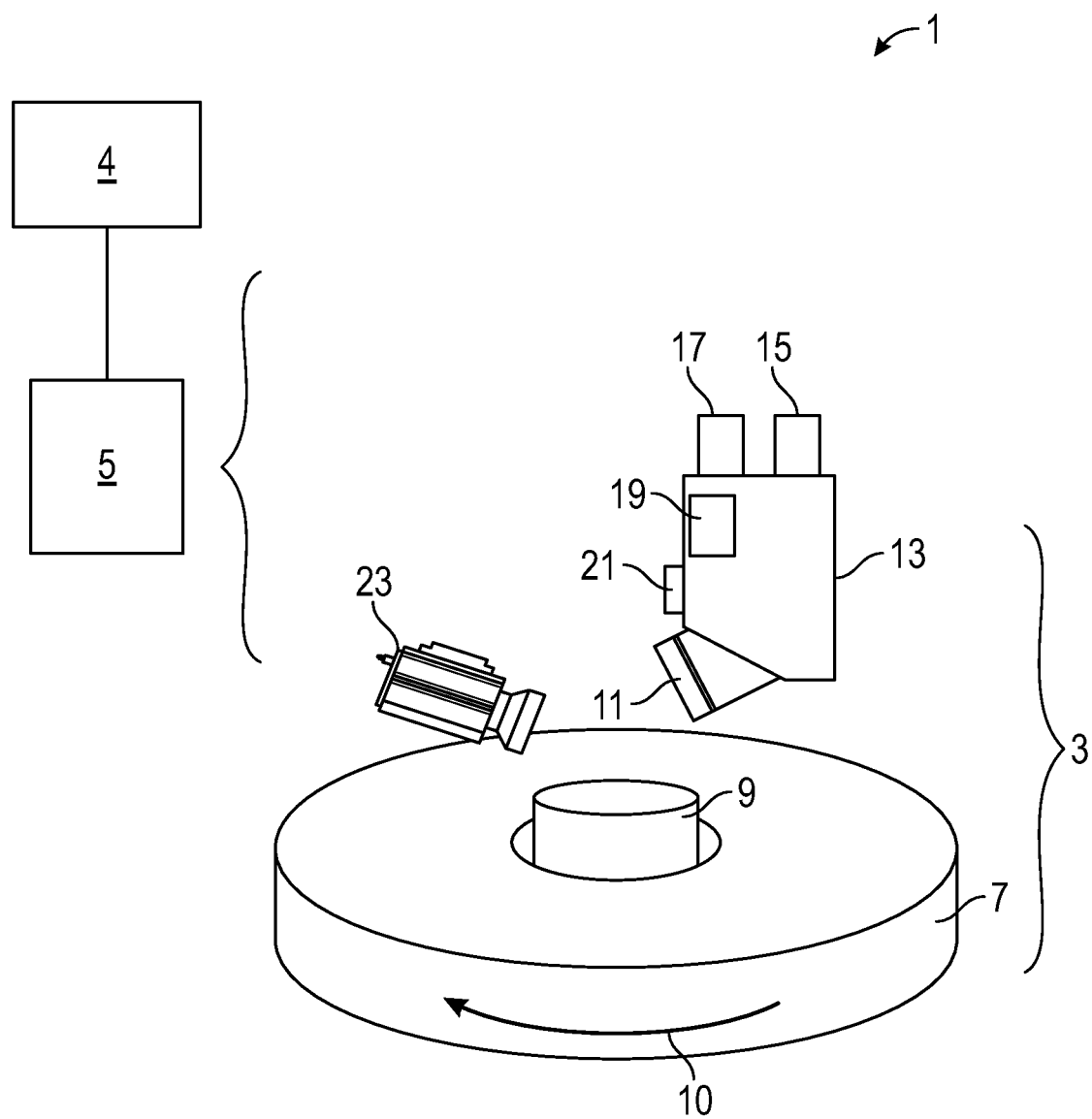
FIG. 1 is a schematic of a testing device, according to one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

One method to non-destructively mechanically test a material is by monitoring for acoustic emissions (AE). When the internal structure of a solid undergoes an irreversible microstructural change, a transient elastic wave called an AE is generated. In such a way, internal microstructural changes may be non-destructively detected by monitoring for AEs within an acoustic signal collected during stressing of a solid.

Upon generation, an AE radiates from its origin through the solid to the surface where it may be detected using an AE sensor. Furthermore, since AEs propagate omnidirectionally from their origin in an isotropic material, triangulation or other methods may be used to determine the origin of a given AE.

An AE is generated during both plastic deformation and sub-critical cracking. Some important microstructural mechanisms of plastic deformation that generate AEs include dislocation formation/multiplication, dislocation motion/glide, yielding, strain hardening, strain-induced phase transformation, and deformation twinning. Similarly, some important microstructural mechanisms of sub-critical cracking that generate AEs include crack nucleation and sub-critical crack growth. Taken as a whole, these deformation mechanisms may cause macroscale and/or microscale changes to the cutting element (e.g., dislocation motion or a visible crack, respectively). In one or more embodiments, detecting AEs to determine toughness specifically involves correlating toughness with macro/microscale changes that are otherwise "invisible" because those changes are too small to see and/or are buried within the material.

Toughness is a measure of the amount of energy absorbed by a material prior to rupture (meaning, catastrophic failure). Most of this energy is absorbed by the material via irreversible microstructural changes, including plasticity and subcritical cracking. Therefore, the toughness of a material under stress may be non-destructively determined by measuring various experimental parameters including the acoustic signal that contains AEs.

In general, embodiments disclosed herein relate to a device and method for characterizing a cutting element by measuring the toughness and the wear resistance of a cutting element in a single wear test by measuring multiple parameters of the cutting element including an acoustic signal that contains AEs. Such measurements may be performed in a wear testing apparatus or may be performed downhole during drilling. In some embodiments, the toughness and wear resistance of the cutting element may be measured at the conclusion of a test or after a drill bit is removed from a well. Alternatively, some embodiments may include real-time dynamic determination of the toughness, the wear resistance, or both during cutting (engagement) or drilling. Here, "real-time" means in less than one (1) second and typically within milliseconds to accommodate for the duration of each process step, for example sensing, data signal generation and transmission, computation, and outputting results.

Embodiments of the present disclosure may provide at least one of the following advantages. Concurrently determining both toughness and wear resistance may allow for faster characterization of a cutting element and may allow multimodal study of multiple materials properties for a single cutting element. Dynamic, real-time determination of toughness, wear resistance, or both during drilling may allow for drilling operations to be altered in response to changes within the cutting element to prevent adverse events such as catastrophic cutting element failure. Further, dynamic, real-time determination of toughness, wear resistance, or both during drilling may detect cutting element failure. Following cutting element failure detection, operators may be able to modify or discontinue drilling to prevent damage to other components or systems.

FIG. 1 is a schematic of an embodiment of a testing device 1. Testing device 1 includes a wear testing device 3, a sensor array 5, and a controller 4.

Wear testing device 3 may take the form of any wear testing device known in the art. Some embodiments of wear testing device 3 may be a device configured to perform a horizontal mill wear test or a vertical turret lathe test (as schematically depicted in FIG. 1).

Wear testing device 3 includes a sample 7 mounted to a sample rotation element 9. Embodiments of wear testing device 3 may be configured so sample 7 may be removed from sample rotation element 9 for additional characterization, replacement, and interchangeability. Sample 7 may be fabricated of one or more materials, such as a metal (for example, steel, an aluminum alloy, or a titanium alloy), a ceramic (for example, quartz or alumina), or a geologic material (for example, granite). Sample 7 may be formed of any material, for example the material typically experienced by a cutting element 11 or the material required by a particular testing standard. In some embodiments, sample 7 may be formed from the geologic material of a known geologic formation. Forming sample 7 of a hard material (relative to cutting element 11) may serve to accelerate testing, maximize mechanical damage, or both.

During a wear test, cutting element 11 engages with sample 7 while sample rotation 7 rotates. The rotation of sample 7 is performed by sample rotation element 9 and is indicated with an arrow 10. Cutting element holder 13 engages cutting element 11 with sample 7. Engagement between cutting element 11 and sample 7 may be directly or indirectly caused by cutting element holder 13. "Engage" and "engagement" as used herein refer to the interaction between cutting element 11 and sample 7 while sample 7 rotates during a wear test.

Wear testing device 3 may be configured to engage cutting element 11 with sample 7 during a wear test. In some embodiments, cutting element holder 13 may move to engage cutting element 11 with sample 7. In some embodiments, cutting element holder 13 may hold cutting element 11 at a specific angle in relation to sample 7. During engagement, cutting element 11 may be pushed toward sample 7 with a particular applied load. This applied load may be generated by an actuator (not depicted) located in cutting element holder 13, in sample rotation element 9, or elsewhere in wear testing device 3. Cutting element 11 may be removably mounted to cutting element holder 13 to allow for replaceability, interchangeability, and to allow for closer inspection and additional characterization of cutting element 11 following engagement.

Although some components of wear testing device 3 are not depicted in FIG. 1, such as a stage upon which sample 7 may be placed, the mechanisms and power sources that may control and power sample rotation element 9 and cutting element holder 13, and the overall structure of wear testing device 3 between sample rotation element 9 and cutting element holder 13, these components may be part of the wear testing device without departing from the scope herein.

Continuing with FIG. 1, testing device 1 also includes sensor array 5, which is communicably connected to controller 4. Sensor array 5 includes multiple devices, for example sensors, which monitor a wear test. Each sensor within sensor array 5 is configured to detect a particular characteristic of testing device 1, to generate a data signal reflecting the particular characteristic, and to transmit the data signal to controller 4. Controller 4 receives the data signals from sensor array 5 for further processing and calculation. Analog or digital data signals may be generated by each sensor within sensor array 5 for transmission to controller 4.

FIG. 1 schematically depicts sensor array 5 directly and communicably connected to controller 4. In such an embodiment, sensor array 5 may include a sensor processor (not depicted) that is intermediately communicably connected between the one or more sensors and controller 4. In some embodiments, one or more sensors within sensor array 5 may be individually and directly communicably connected to controller 4 without an intermediate sensor processor.

Some embodiments of controller 4 may calculate the toughness, the wear resistance, or both in real-time using real-time measurements from sensor array 5. Thus, some embodiments of testing device 1 may be used to understand the changes in the toughness, the wear state, or both throughout a wear test.

Figure 7:
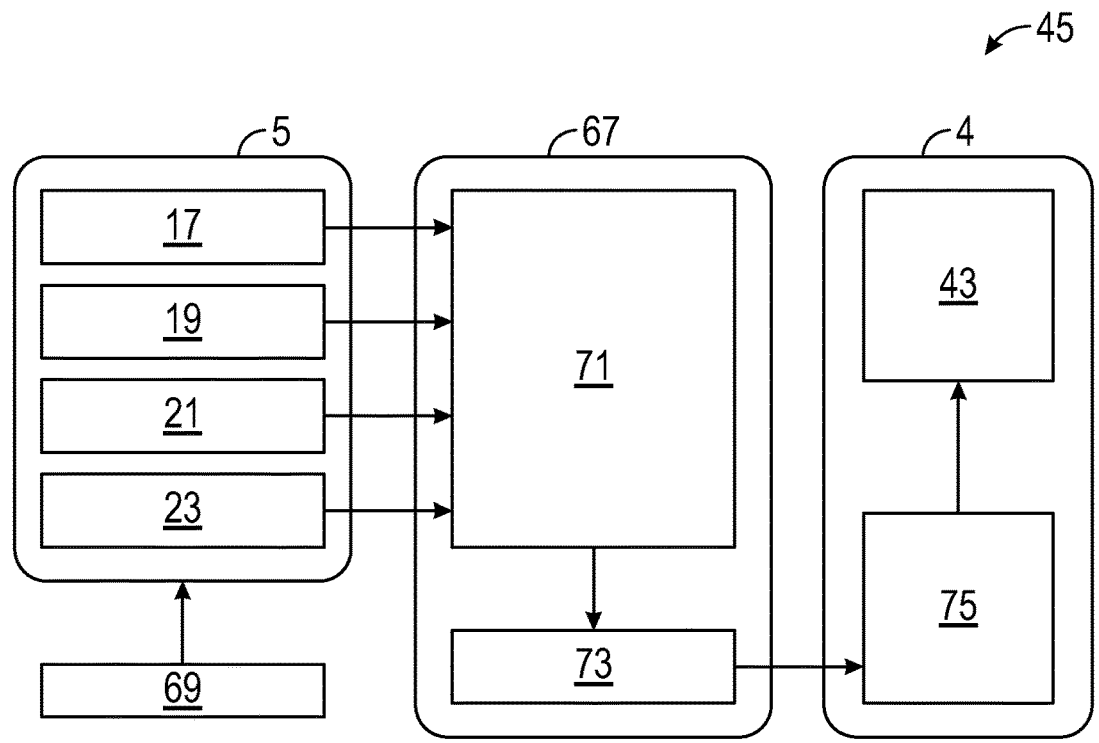
FIG. 7 is a schematic of a drilling tool, according to one or more embodiments.
Figure 13:
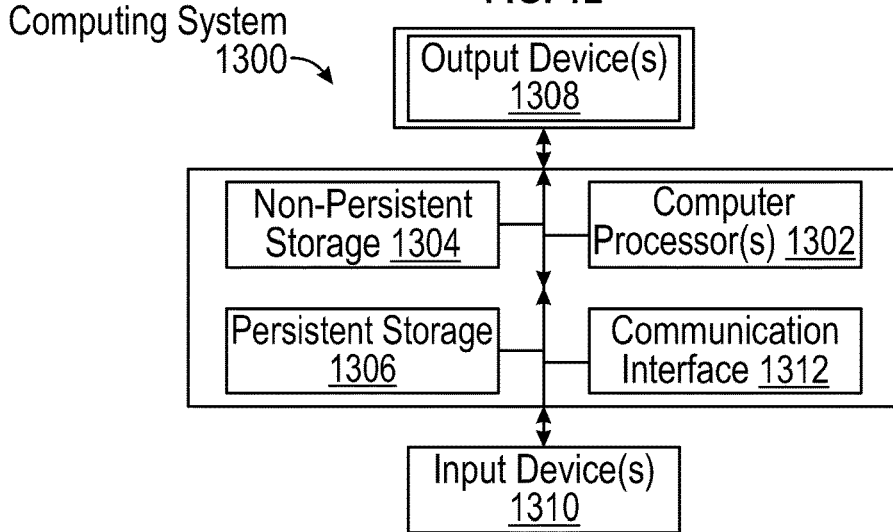
FIG. 13 shows a computing device, according to one or more embodiments.

Controller 4 may take the form of a controller 4 as depicted in FIG. 7 or of a computing device 1300 as depicted in FIG. 13 further. To that end, controller 4 may include one or more devices, where each device may be a chip, a microcontroller, an expansion card, a peripheral controller device, or some other digital or analog controlling or calculating device known in the art. Controller 4 may also include a printed circuit board (such as a motherboard) to connect one or more devices.

The wired communication connections between any components described herein such as between sensor array 5 and controller 4 may be formed of a data cable (for example, a twisted pair cable, a coaxial cable, or an optical fiber cable), a microelectronic connector (for example, an interconnect or an optical interconnect), or any other data transmission device known in the art.

Some embodiments of controller 4 may be a single device that acts as all modules of controller 4. To that end, in the embodiment depicted in FIG. 3, controller 4 acts as a wear acquisition module 27, a load acquisition module 29, a temperature acquisition module 31, a vibration acquisition module 33, an AE acquisition module 35, and a calculation module 43. Alternatively, in some embodiments, controller 4 may include multiple devices, with each device serving as one or more of the modules of controller 4.

In the embodiment depicted in FIG. 1, sensor array 5 includes a vibration sensor 15, a load sensor 17, an AE sensor 19, a temperature sensor 21, and a wear sensor 23. Those skilled in the art will appreciate that sensor array 5 may include fewer or more sensors without departing from the scope herein.

The vibration sensor 15 is configured to measure one or more vibrations of cutting element 11 during engagement between cutting element 11 and sample 7 and generate a vibration data signal. In some embodiments, vibration sensor 15 may directly measure vibrations, for example by sensing the vibration frequency and/or vibration amplitude with a displacement sensor, a velocity sensor, an accelerometer, or any other vibration sensor type known in the art. Alternatively, in some embodiments, vibration sensor 15 may indirectly measure vibrations, for example by determining the vibrations frequency and/or amplitude by analyzing images captured by an image capture device (such as a camera).

Vibration sensor 15 may be positioned at any location on or near cutting element 11, including being attached to cutting element 11. In some embodiments, vibration sensor 15 may be located on or in wear testing device 3. For example, in the embodiment depicted in FIG. 1, vibration sensor 15 is located on cutting element holder 13. In some embodiments, vibration sensor 15 may be not be located on or in wear testing device 3, such as embodiments where vibrations are indirectly measured.

In some embodiments, it may be reasonable to assume the vibrations experienced by cutting element 11 is roughly equivalent to the vibrations measured by vibration sensor 15. Such an assumption may be reasonable when cutting element 11 is firmly attached to cutting element holder 13 and/or when all components between cutting element 11 and vibration sensor 15 (including any intermediate components between cutting element 11 and cutting element holder 13) are formed of stiff materials (i.e., materials that resist mechanical deformation). In other embodiments, calibration may be applied to the sensor readings from vibration sensor 15 to more accurately reflect the vibrations experienced by the cutting element 11.

Sensor array 5 may include a load sensor 17 configured to measure an applied load applied by cutting element 11 during engagement between cutting element 11 and sample 7 and generate a load data signal. Specifically, during engagement, as discussed previously, cutting element holder 13 pushes cutting element 11 toward sample 7 causing cutting element 11 to exert some applied load on sample 7. In some embodiments, the force applied by cutting element holder 13 toward sample 7 may be generated by an actuator (not depicted) within wear testing device 3.

In some embodiments, load sensor 17 may directly measure the applied load, for example by measuring the applied load with a load cell, a strain gauge, a piezoelectric load cell, a hydraulic load cell, a pneumatic load cell, or any other load sensor type known in the art. In other embodiments, load sensor 17 may indirectly measure the applied load, for example by load sensor 17 reporting the load generated by the actuator (not depicted).

In some embodiments, load sensor 17 may be positioned at any location on or near cutting element 11, including being attached to cutting element 11. In some embodiments, load sensor 17 may be located on or in wear testing device 3. For example, in the embodiment depicted in FIG. 1, load sensor 17 is located on cutting element holder 13. In some embodiments, it may be reasonable to assume that the load generated by the actuator (not depicted) is roughly equivalent to the load applied by cutting element 11 on sample 7, particularly in an embodiment where each component between the actuator (not depicted) and cutting element 11 are formed of stiff materials. In some embodiments, load sensor 17 may be positioned on or in any component between the actuator (not depicted) and cutting element 11.

AE sensor 19 of sensor array 5 is configured to measure the acoustic waves, which together comprise the acoustic signal, within cutting element 11 and generate an acoustic data signal. The resulting acoustic data signal is a data signal generated by AE sensor 19 that encodes the detected acoustic signal. Acoustic sensing by AE sensor 19 may be performed in real-time during wear testing.

After an acoustic wave is created by some process, it may be in the acoustic signal detected by AE sensor 19 and subsequently included in the acoustic data signal generated by AE sensor 19. Once such an acoustic wave has been detected and included in the acoustic signal, it is termed an "acoustic feature" of the acoustic signal. Thus, because engagement between cutting element 11 and sample 7 generates numerous acoustic waves through many processes, the acoustic signal detected by AE sensor 19 includes many acoustic features.

The acoustic signal detected by AE sensor 19 (and the acoustic data signal generated by AE sensor 19) may include AEs originating within cutting element 11 generated by irreversible microstructural changes resulting from engagement between cutting element 11 and sample 7. Taken as a whole, these irreversible microstructural changes cause macroscale and/or microscale changes to the cutting element. However, the acoustic signal detected by AE sensor 19 (and the acoustic data signal) may include acoustic features not generated due to AEs within cutting element 11. Thus, the acoustic signal (and the acoustic data signal) may also include acoustic features generated by other processes and having other origins. Specifically, the acoustic signal (and the acoustic data signal) may also include acoustic features with origins within sample 7 or elsewhere within the environment, including background noise. Consequently, it is very important to process the acoustic signal (by processing the acoustic data signal) to separate the AEs originating within cutting element 11 by removing other acoustic features. Such signal processing will be detailed as Step 1006 in FIG. 10, discussed further.

AE sensor 19 may be any sensor capable of detecting an acoustic signal and generating an acoustic data signal that reflects the acoustic signal, including a solid state acoustic sensor (for example, a thickness-shear mode resonator, a surface acoustic wave sensor; a shear-horizontal acoustic plate mode sensor, or a flexural plate wave sensor) or a microphone (for example, a condenser, fiber-optic, or piezoelectric microphone).

AE sensor 19 may be positioned at any location on or near cutting element 11, including being attached to cutting element 11. In some embodiments, AE sensor 19 may be located on or in wear testing device 3. For example, in the embodiment depicted in FIG. 1, AE sensor 19 is located on cutting element holder 13. Because acoustic waves may dissipate on a shorter length scale than some of the other energetic phenomena that are measured and/or because AEs may have a relatively low amplitude, some embodiments of sensor array 5 may locate AE sensor 19 on or very close to cutting element 11.

Temperature sensor 21 of the sensor array 5 is configured to measure a temperature of cutting element 11 during engagement between cutting element 11 and sample 7 and generate a temperature data signal. In some embodiments, the temperature of cutting element 11 may change (for example, increase) during engagement between cutting element 11 and sample 7 due to multiple factors. One cause for such a temperature increase may be friction generated by the rotation of sample 7 against cutting element 11. If the temperature goes up very high during the wear test to cause a phase transformation of the material of the cutting element 11, such as when diamond is transformed to graphite, the AE measurement and calculation of toughness may be invalid. Temperature sensor 21 is used to monitor the temperature mainly to determine whether the AE measurement is valid or not.

In some embodiments, temperature sensor 21 may directly measure the temperature, such as by measuring the temperature with a thermocouple, a resistance temperature detector, a thermistors, a semiconductor-based integrated circuit, or any other temperature sensor type known in the art. In other embodiments, temperature sensor 21 may indirectly measure the temperature, such as with a thermal image capture device (such as a thermal imaging camera) or an infrared laser thermometer.

Temperature sensor 21 may be positioned at any location on or near cutting element 11, including being attached to cutting element 11. In some embodiments, temperature sensor 21 may be located on or in wear testing device 3. For example, in the embodiment depicted in FIG. 1, temperature sensor 21 is located on cutting element holder 13. Because heat may dissipate on a shorter length scale than some of the other energetic phenomena that are measured, some embodiments of sensor array 5 may locate temperature sensor 21 on or very close to cutting element 11. In some embodiments, temperature sensor 21 may be positioned at an appropriate location for indirectly measuring the temperature of cutting element 11.

The sensor array 5 may include wear sensor 23 configured to measure the wear state of cutting element 11 during engagement between cutting element 11 and sample 7 and generate a wear data signal. The wear state of cutting element 11 is a measure of the permanent deformation formed in cutting element 11 during engagement with sample 7. Any metric known in the art that quantitatively defines material wear may be used to quantify the wear state of cutting element 11, for example the weight loss of cutting element 11 or the wear coefficient of cutting element 11.

In some embodiments, wear sensor 23 may directly measure the wear state of cutting element 11 during engagement using a device that directly measures these features. In some embodiments, wear sensor 23 may indirectly measure the wear state of cutting element 11, for example by determining the wear state of cutting element 11 using analysis of images captured by an image capture device (such as a camera). In some embodiments, the image capture device serving as wear sensor 23 may be a charge-coupled device (CCD) camera attached to an optical magnification device such as an optical microscope or camera lens. Further, in some embodiments, the wear state of cutting element 11 may be determined after engagement via direct assessment of cutting element 11, for example by imaging or weighing cutting element 11 after removal from wear testing device 3.

Wear sensor 23 may utilize any microscopy technique known in the art, such as polarized light microscopy. Using polarized light microscopy, one may be able to image aspects of the surface microstructure of cutting element 11, such as crystal grains, grain boundaries, and crystalline defects such as dislocations or twin boundaries. Thus, in some embodiments, wear sensor 23 may image the microstructure of cutting element 11.

Wear sensor 23 may be located at any location on or near cutting element 11, including being attached to cutting element 11. In some embodiments, wear sensor 23 may be located on or in wear testing device 3. In some embodiments, wear sensor 23 may be positioned at an appropriate location for capturing images of cutting element 11. For example, in the embodiment depicted in FIG. 1, wear sensor 23 is a camera located near to and focused on cutting element 11.

In FIG. 1, vibration sensor 15, load sensor 17, AE sensor 19, and temperature sensor 21 are located on cutting element holder 13, while wear sensor 23 is located apart from cutting element holder 13 to better image the interaction between sample 7 and cutting element 11. Those skilled in the art will appreciate that each sensor of sensor array 5 may be located at any position where a sufficiently accurate measurement can be made without departing from the scope herein.

In one or more embodiments, testing device 1 may be built specifically for both wear testing and toughness measurement via AEs. Alternatively, in some embodiments, an existing wear testing device 5 may be modified or supplemented to measure toughness of cutting element 11 via AEs during wear testing of cutting element 11. For simplicity, sensor array 5 includes all sensors communicably connected to controller 4 for calculating wear resistance and toughness, including both existing sensors located within an existing wear testing device 3 and sensors added via modification or supplementation.

Because an existing wear testing device 3 may include sensors that generate data signals useful for calculating wear resistance and toughness, in some embodiments, any existing sensor with a useable data signal may be communicably connected to controller 4 and, thus, be incorporated into sensor array 5. Consequently, in some embodiments, only the sensor(s) specifically needed to determine toughness and not included in existing wear testing device 3 (such as AE sensor 19) may be added when modifying an existing wear testing device 3.

Alternatively, in some embodiments, sensor array 5 and controller 4 may be a separate module configured to supplement an existing wear testing device 3 without communicably connecting to any sensors of existing wear testing device 3. Consequently, such a separate module may include all sensors needed by controller 4 to determine wear resistance and toughness.

Figure 2:
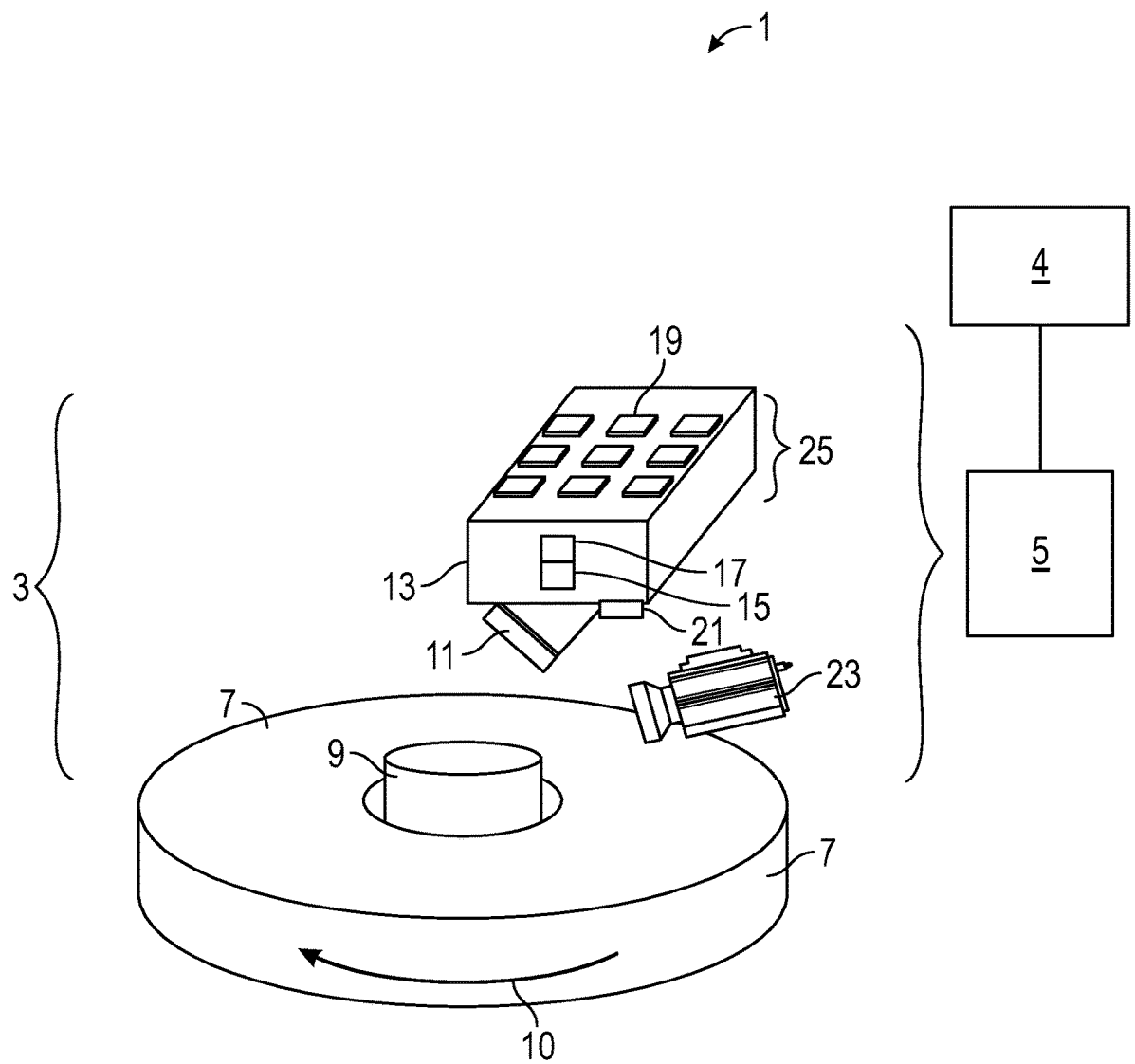
FIG. 2 is a schematic of a testing device, according to one or more embodiments.

FIG. 2 depicts a schematic of another embodiment of a testing device 1, which includes wear testing device 3, controller 4, and sensor array 5.

In FIG. 2, sensor array 5 includes nine (9) AE sensors 19, which together form an AE sensor array 25. Each AE sensor 19 within AE sensor array 25 may function as discussed previously, meaning by detecting an acoustic signal and generating an acoustic data signal. AE sensors 19 are arranged in a 3×3 grid on cutting element holder 13. Those skilled in the art will appreciate that although nine AE sensors 19 are shown in FIG. 2, AE sensor array 25 may include any number of AE sensors 19 without departing from the scope herein. For example, the AE sensor array 25 may include anywhere between two (2) and 1000 AE sensors 19. Further, the AE sensors 19 may have any regular or irregular arrangement and may be located anywhere on or in testing device 1.

The wear testing device 3 of FIG. 2 has the same components as the wear testing device 3 depicted in FIG. 1. However, to accommodate AE sensor array 25, cutting element holder 13 has a different shape in FIG. 2.

In some embodiments, AE sensor array 25 may be used to determine an origin for the acoustic features in the plurality of acoustic signals detected during engagement, such as by triangulating an origin for each acoustic feature. See the discussion of Step 1106 in FIG. 11 for additional details.

Figure 3:
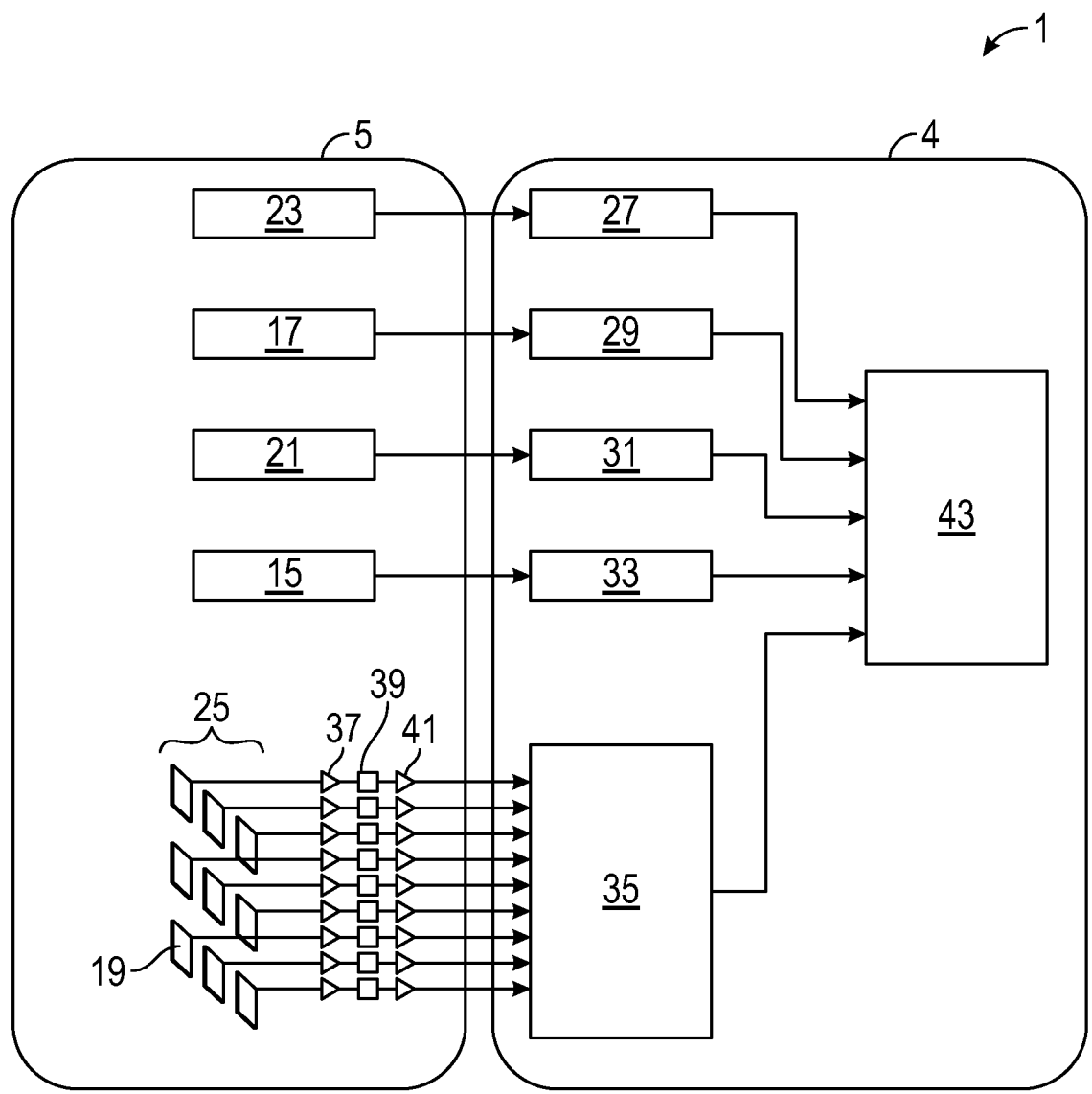
FIG. 3 is a schematic of a testing device, according to one or more embodiments.

FIG. 3 depicts an alternative schematic of testing device 1 as shown in FIG. 2 including an AE sensor array 25. One having skill in the art will appreciate how to adapt the configuration depicted in FIG. 3 to a testing device 1 with one AE sensor 19 as in FIG. 1. As in FIG. 2, sensor array 5 also includes wear sensor 23, load sensor 17, temperature sensor 21, and vibration sensor 15.

In the embodiment of FIG. 3, controller 4 includes multiple modules: a wear acquisition module 27, a load acquisition module 29, a temperature acquisition module 31, a vibration acquisition module 33, and an AE acquisition module 35.

Each sensor in sensor array 5 is communicably connected to controller 4. More specifically, each sensor is connected its corresponding acquisition module within controller 4. As shown in FIG. 3, wear sensor 23 is communicably connected to wear acquisition module 27, load sensor 17 is communicably connected to load acquisition module 29, temperature sensor 21 is communicably connected to temperature acquisition module 31, and vibration sensor 15 is communicably connected to vibration acquisition module 33. Regarding AE sensor array 25, each AE sensor 19 is communicably connected to AE acquisition module 35. Therefore, sensor array 5 measures and transmits data signals generated by the appropriate sensors 15, 17, 19, 25 that encode the wear state, the applied load, the temperature, the vibration, and the plurality of acoustic signals to controller 4.

As in FIG. 3, in some embodiments, each AE sensor 19 of AE sensor array 25 may be directly communicably connected to controller 4. Alternatively, in some embodiments, AE sensor array 25 may include a signal combining module (not depicted) that receives the acoustic data signal from each AE sensor 19, combines the plurality of acoustic data signals, and transmits a combined signal to controller 4 over a shared connection. Examples of a signal combining module include a signal processor or a multiplexer.

In some embodiments, the acoustic data signal(s) (thus, the acoustic signal(s)) may be preprocessed prior to transmission to AE acquisition module 35. Such preprocessing may process the acoustic data signal(s) (thus, the acoustic signal(s)) in one or more ways, for example, to remove noise, to increase acoustic signal amplitude, to improve signal-to-noise ratio, or to filter the acoustic data signal (thus, the acoustic signal). In the embodiment depicted in FIG. 3, this preprocessing is performed by a preamplifier 37, a filter 39, and an amplifier 41 that are communicably located between each AE sensor 19 and AE acquisition module 35. Such preprocessing may also be utilized in a testing device 1 with one AE sensor 19, as in FIG. 1. In some embodiments, the acoustic data signal(s) (thus, the acoustic signal(s)) may be preprocessing with alternative method(s) or device(s) known in the art.

In one or more embodiments, controller 4 also includes a calculation module 43, which is communicably connected to each acquisition module within controller 4. Calculation module 43 receives data signal(s) from each acquisition module within controller 4 and calculates the wear resistance and the toughness of cutting element 11. Calculation module 43 may include one or more components to perform the calculation functions described herein. Embodiments of calculation module 43 may include one or more of computer processor(s), memory module(s), control module(s), and computer interface(s).

Figure 4:
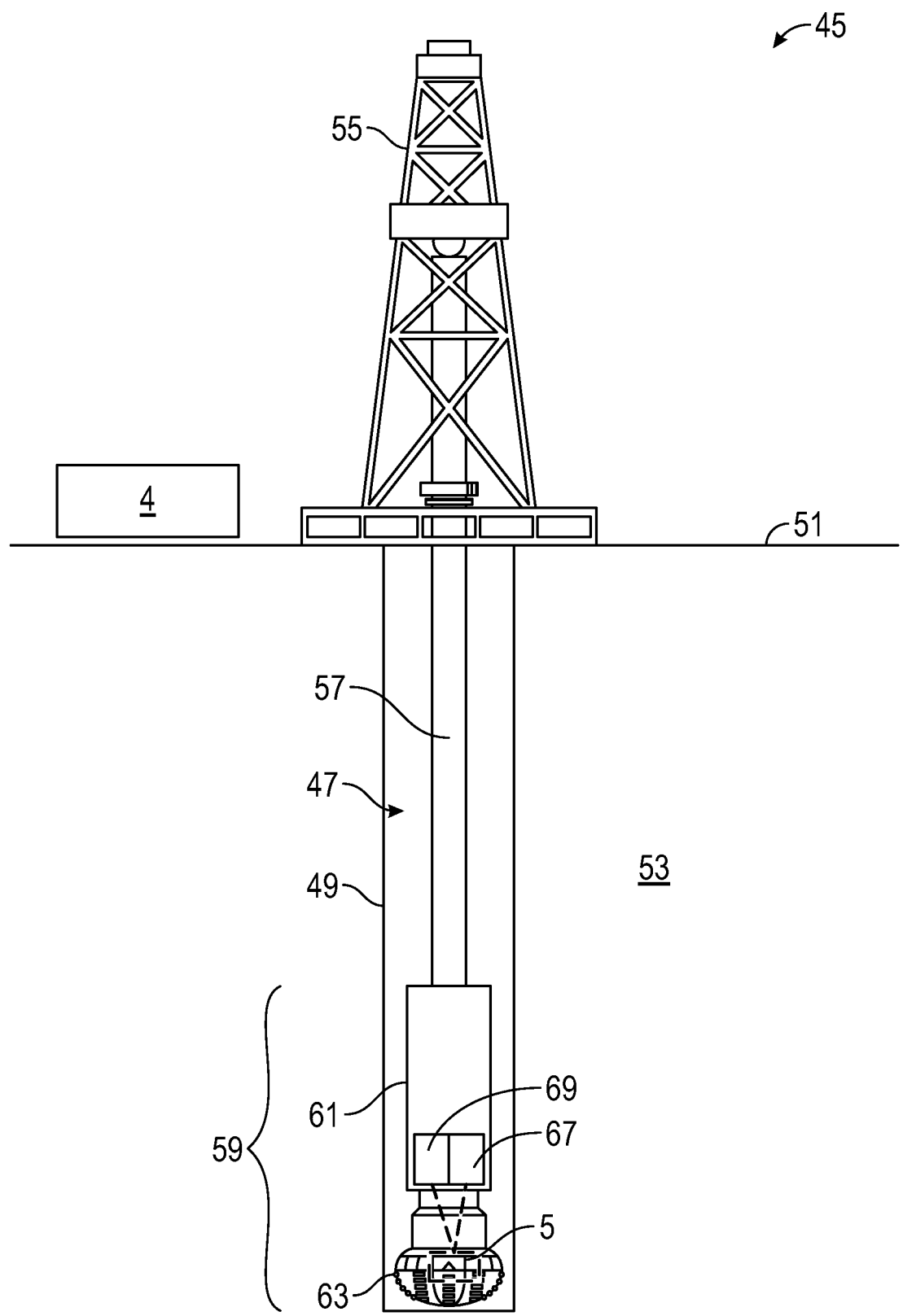
FIG. 4 is a schematic of a drilling tool, according to one or more embodiments.

FIGS. 1-3 depict sensor array 5 and controller 4 incorporated into testing device 1 to study the effects of sample 7 engagement on cutting tool 11. Testing device 1 may be lab-bench scale so as to be deployable in a laboratory, factory, or workshop setting. FIG. 4 depicts sensor array 5 and controller 4 incorporated into a drilling tool 45 to enable in situ evaluation of cutting tool 11 as it drills a wellbore 47 within a formation 53. One having skill in the art will appreciate how embodiments of sensor array 5 and controller 4 as depicted in FIGS. 1-3 and discussed previously may be incorporated into drilling tool 45 as depicted in FIGS. 4-9 and discussed further.

To that end, FIG. 4 depicts a schematic of a drilling tool 45 deployed to drill wellbore 47 defined by a borehole 49 dug below a surface 51 and into formation 53. Drilling tool 45 includes a derrick 55 connected to a drill pipe 57 and a bottom hole assembly 59. Bottom hole assembly 59 includes a drill collar 61 connected to a drill bit 63. Drilling tool 45 also includes a power module 69 and a communication device 67 positioned on drill collar 61 and sensor array 5 positioned on drill bit 63. Drilling tool 45 also includes controller 4 located out of wellbore 47 and above surface 51.

In drilling tool 45, controller 4 and sensor array 5 may be directly or indirectly communicably connected. Additionally, controller 4 and sensor array 5 may be continuously or intermittently communicably connected.

In FIG. 4, drilling tool 45 lacks a direct, continuous connection between controller 4 and sensor array 5, such as may be provided by a wired data connection such as a data cable. Here, communication device 67 has a wired data connection to sensor array 5 and a wireless data connection to controller 4. Therefore, communication device 67 indirectly connects sensor array 5 and controller 4.

Drilling tool 45 may or may not include communication device 67. In some embodiments, communication device 67 may serve to communicably connect sensor array 5 and controller 4. Some embodiments of drilling tool 45 may include communication device 67 to indirectly connect sensor array 5 to controller 5 via one or more wireless communication methods known in the art. Communication device 67 may transmit information from sensor array 5 to controller 4; from controller 4 to sensor array 5; or both. One type of information that might move from sensor array 5 to controller 4 may include sensor data signal(s), while one type of information that might move from controller 4 to sensor array 5 may include operational instructions.

Some embodiments of drilling tool 45 with controller 4 located above surface 51 and sensor array 5 insertable in wellbore 47 may not include communication device 67. Instead, controller 4 and sensor array 5 may be continuously, directly communicably connected such as with a long, wired data connection between controller 4 and sensor array 5. Such a "long" wired data connection may have a length sufficient to reach the maximum drilling depth of wellbore 47, for example a length greater than 25 meters, greater than 1,000 meters, or greater than 10,000 meters.

In some embodiments, controller 4 and sensor array 5 may both be located on or near drill bit 63, allowing controller 4 and sensor array 5 to both be inserted downhole in wellbore 47. In such embodiments, controller 4 and sensor array 5 may be continuously, directly communicably connected via a short, wired data connection. Such a "short" wired data connection may have a length of less than 25 meters or less than 2 meters.

In some embodiments, sensor array 5 may generate real-time data signals, sensor array 5 may transmit the data signals to controller 4, and controller 4 may perform calculations using the real-time data signals. Thus, some embodiments of drilling tool 45 may determine the toughness, the wear resistance, or both of cutting tool 11 during drilling in real-time. Such real-time calculations may enable operators or artificial intelligence modules to make real-time operation drilling decisions that depend on real-time measures of the toughness, the wear resistance, or both of cutting tool 11.

Some embodiments of drilling tool 45 may include power module 69 located within wellbore 47 to electrically power communication device 67, sensor array 5, or both. In some embodiments, power module 69 may be a battery, a fuel cell, a generator, or some other remote power source known in the art. Some embodiments of drilling tool 45 may not include power module 69. In some embodiments, communication device 67, sensor array 5, or both may be electrically connected to and powered by some other power source, such as another component within wellbore 47 or a power source located out of wellbore 47. The electrical connections within drilling tool 45, such as between power module 69 and sensor array 5, may be of any type known in the art including an electrical wire. In some embodiments, a wired data connection to sensor array 5 may also serve as an electrical connection for sensor array 5.

Figure 5:
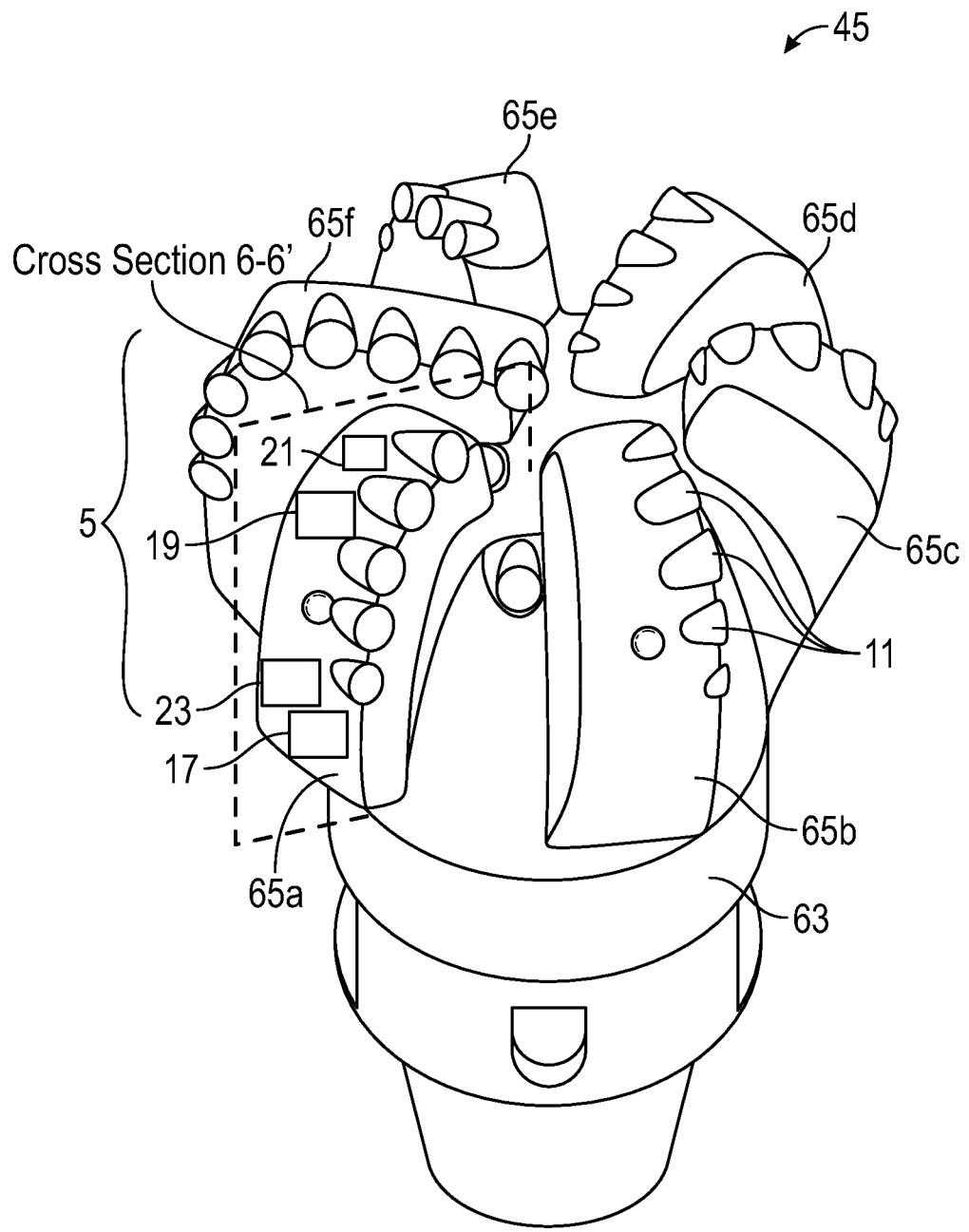
FIG. 5 is a schematic of a drilling tool, according to one or more embodiments.
Figure 6:
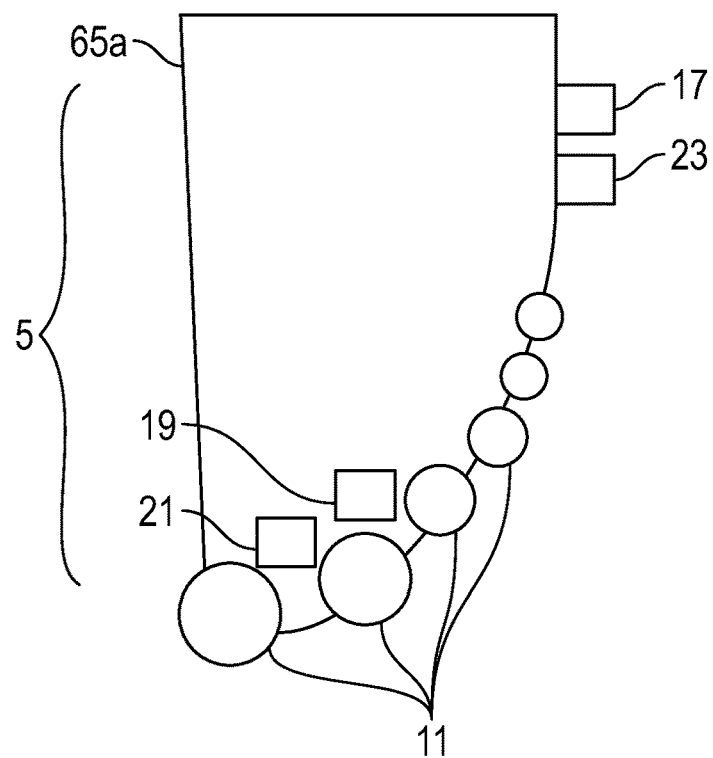
FIG. 6 is a schematic of a drilling tool, according to one or more embodiments.

FIG. 5 depicts an alternate schematic of drilling tool 45 focused on sensor array 5 and drill bit 63, with drill bit 63 including six drill bit arms 65a-65f. FIG. 6 depicts a cross section taken through drill bit arm 65a on a plane indicated between 6 and 6'. On each drill bit arm 65a-65f are multiple cutting elements 11.

Sensor array 5 includes temperature sensor 21, AE sensor 19, wear sensor 23, and load sensor 17. One having skill in the art will appreciate how sensor array 5 on drill bit 63 may include any sensor discussed previously, such as AE sensor array 25 or vibration sensor 15.

Each sensor of sensor array 5 is arranged on drill bit arm 65a of drill bit 63. Specifically, temperature sensor 21 and AE sensor 19 are positioned proximate to one or more cutting elements 11 of drill bit arm 65a. Such proximity may allow temperature sensor 21 and AE sensor 19 to more accurately monitor the temperature and acoustic waves of one or more cutting elements 11. Wear sensor 23 and load sensor 17 are also located on drill bit arm 65a, however, wear sensor 23 and load sensor 17 are located further from the cutting elements 11 of drill bit arm 65a.

Furthermore, as may be better seen in the cross-sectional view shown in FIG. 6, temperature sensor 21 and AE sensor 19 are embedded in drill bit arm 65a, while wear sensor 23 and load sensor 17 are located on an external surface of drill bit arm 65a. In some embodiments, each sensor 17, 19, 21, 23 of sensor array 5 may be embedded in or located on any component of bottom hole assembly 59, such as in or on drill bit 63 including in or on drill bit arm(s) 65a-65f.

As discussed previously, the accuracy of each sensor within sensor array 5 may be more sensitive to or less sensitive to the configuration of (including distance between) the sensor and the cutting element 11 of interest. In one or more embodiments, sensors 17, 19, 21, 23 of sensor array 5 may have any arrangement with relation to drill bit 63. In some embodiments, as in FIGS. 5 and 6, all sensors of sensor array 5 may be located proximate to a single drill bit arm 65a. In some embodiments, some of the sensors of sensor array 5 may be located proximate to drill bit arm 65a and other of the sensors of sensor array 5 may be located elsewhere in or on drill bit 63. In some embodiments, some of the sensors of sensor array 5 may be located proximate to drill bit 63 (including proximate to drill bit arm(s) 65a-65f) and other of the sensors of sensor array 5 may be located elsewhere in drilling tool 45 (such as proximate to drill collar 61).

FIGS. 5 and 6 include a single sensor 17, 19, 21, 23 of each included sensor type. In some embodiments, sensor array 5 may include one or more sensor 17, 19, 21, 23 of each included type. As an illustrative example, in one or more embodiments, sensor array 5 may include multiple temperature and AE sensors 19, 21, but only one wear sensor 23 and one load sensor 17. To that end, in one or more embodiments, each pair of temperature and AE sensors 19, 21 may be configured for monitoring a particular cutting element(s) 11.

Drill bit 63 in FIG. 5 is a polycrystalline compact drill bit 63 with six drill bit arms 65a-65f. However, one or more embodiments of drilling tool 45 may include a drill bit 63 formed of any material, such as polycrystalline diamond, thermally stable polycrystalline diamond, impregnated diamond, tungsten carbide, steel, or any other material(s) known in the art, or a combination of materials. Further, one or more embodiments of drilling tool 45 may include a drill bit 63 having any configuration, such as a milled tooth bit, a roller cone bit, a matrix bit, a non-core bit, a cutter coring bit, a drag bit, a double cutter bit, a core bit, a drag bit, an insert bit, a compact drill bit, a tri-cone bit, or any other drill bit geometry or configuration known in the art. Finally, one or more embodiments of drilling tool 45 may include a drill bit 63 having any number of drill bit arms 65a-65f, such as three arms, four arms, five arms, six arms, or any other number of drill bit arms 65a-65f known in the art.

FIG. 7 depicts an alternative schematic of drilling tool 45 shown in FIGS. 4, 5, and 6. As in FIG. 4, drilling tool 45 includes power module 69, communication device 67, sensor array 5, and controller 4. As in the enlarged view of FIG. 4 shown in FIGS. 5 and 6, sensor array 5 includes AE sensor 19, load sensor 17, temperature sensor 21, and wear sensor 23.

FIG. 7 also shows the components of communication device 67 and controller 4. Communication device 67 includes a data module 71 and a wireless transmitter 73. Controller 4 includes a wireless receiver 75 and a calculation module 43 (similar to controller 4 in FIG. 3 above).

Power module 69 is connected to and configured to power sensor array 5. Power module 69 may also be connected to and configured to power communication device 67. As discussed previously, power module 69 may have any form known in the art, for example a battery, a generator, or a fuel cell.

In FIG. 7, each sensor (i.e., AE sensor 19, load sensor 17, temperature sensor 21, and wear sensor 23) of sensor array 5 is directly communicably connected to communication device 67.

In drilling tool 45 depicted in FIG. 7, sensor data is collected by the four sensors 17, 19, 21, 23 of sensor module 5; transferred via a wired data connection between each sensor 17, 19, 21, 23 and data module 71 within communication device 67; transferred via a wireless data connection between wireless transmitter 73 within communication device 67 and wireless receiver 75 within controller 4; and analyzed in calculation module 43 of controller 4. Communication device 67 may have a wired data connection to each sensor 17, 19, 21, 23 of sensor array 5. Alternatively, the connection between communication device 67 and one or more sensor 17, 19, 21, 23 of sensor array 5 may be a wireless data connection having any type. Communication device 67 may have a wired or wireless data connection to controller 4. Finally, communication device 67 may have a wired or wireless data connection to a sensor processor (not depicted) of sensor array 5.

As in FIG. 7, some embodiments of communication device 67 may include data module 71 configured to receive a data signal from all sensors 17, 19, 21, 23 of sensor array 5. Thus, some embodiments of data module 71 may include one or more communication module(s) (not depicted) for receiving input from each sensor 17, 19, 21, 23 of sensor array 5. Some embodiments of data module 71 may be further configured to initially process incoming data signal(s), to digitally store data, or both. Thus, some embodiments of data module 71 may include one or more modules not depicted, including digital memory or analog and/or digital data signal processing circuitry. Further, some embodiments of communication device 67 may include wireless transmitter 73 configured to wirelessly transmit the data signal(s) to wireless receiver 75 within controller 4.

In the embodiment depicted in FIG. 7, information only travels from sensor array 5 to controller 4, and not in the reverse direction. However, as discussed previously, information (such as operational instructions) may travel from controller 4 to sensor array 5 in some embodiments. One having skill in the art will appreciate how controller 4 and communication device 67 may be configured for such communication. For example, in one or more embodiments, controller 4 may include a wireless transmitter (not depicted) to wirelessly transmit information to communication device 67 and communication device 67 may include a wireless receiver (not depicted) to receive the incoming, wirelessly transmitted information from controller 4.

Each wireless data connection included in drilling tool 45 may rely on any wireless data transmission method known in the art, for example electromagnetic/radio frequency communications (for example, Wi-Fi or Bluetooth), acoustic telemetry, or pressure/flow data transmission. Furthermore, drilling tool 45 may include one or more wireless data connection, such as between communication device 67 and controller 4 and/or between one or more sensor 17, 19, 21, 23 of sensor array 5 and communication device 67.

Some embodiments of communication device 64 may lack wireless transmitter 73 and some embodiments of controller 4 may lack wireless receiver 75. In such embodiments, data module 71 may have a memory capacity sufficiently large to store all data signals generated during drilling. Subsequently, in such an embodiment, the stored data may be downloaded from communication device 64 to controller 4 at a later time, such as after drill bit 63 is removed from wellbore 47.

As discussed previously, some embodiments of drilling tool 45 may locate controller 4 proximately to drill bit 63. In such embodiments, controller 4 may have a memory capacity sufficiently large to store all data signals and/or calculation results generated during drilling. Subsequently, in such an embodiment, the stored data may be downloaded from controller 4 at a later time, such as after drill bit 63 is removed from wellbore 47. Alternatively, to enable real-time operations, drilling tool 45 may include a data connection (wired or wireless) between controller 4 and other tool(s) (not depicted) located in wellbore 47 or above surface 51 and/or between controller 4 and other computational/display component(s) (not depicted) located above surface 51. One having skill in the art will appreciate how to modify the components of drilling tool 45 for each of these configurations.

Figure 8:
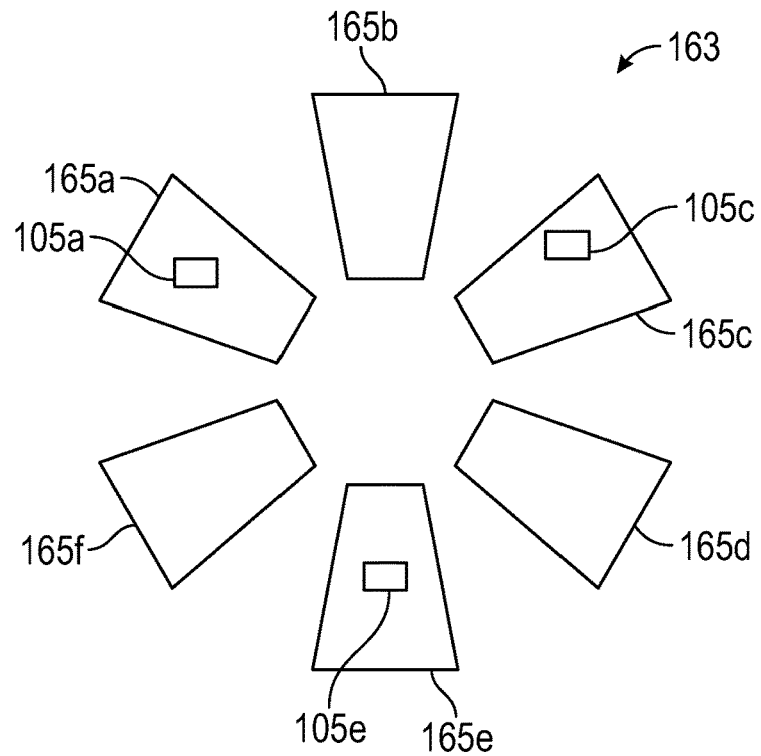
FIG. 8 is a schematic of a drilling tool, according to one or more embodiments.

FIG. 8 depicts a schematic of an embodiment of drilling tool 45 (FIG. 4) focused on a drill bit 163 viewed from below. Drill bit 163 includes three (3) sensor arrays 105a, 105c, 105e and six (6) drill bit arms 165a-165f. Sensor array 105a is located proximate to drill bit arm 165a; sensor array 105c is located proximate to drill bit arm 165c; and sensor array 105e is located proximate to drill bit arm 165e. Each sensor array 105a, 105c, and 105e may include any number of and type of sensors or other components discussed previously, including any number of AE sensor(s) 19 (FIG. 5), AE sensor array(s) 25 (FIG. 2), or both. Finally, a sensor data signal from each sensor array 105a, 105c, 105e is communicated to a controller 4 (FIG. 4), allowing the controller 4 (FIG. 4) to calculate toughness and wear resistance for the cutting element(s) 11 (FIG. 5) of three drill bit arms 165a, 165c, 165e.

In some embodiments, drilling tool 45 (FIG. 4) may include any number of sensor arrays 105a, 105c, 105e. The multiple sensor arrays 105a, 105c, 105e may have any arrangement on drill bit 163. In such an embodiment, controller 4 (FIG. 4) may calculate toughness and wear resistance using the data signal from each sensor array 105a, 105c, 105e. In some embodiments, the calculation results may reflect the toughness and wear resistance for one or more cutting elements 11 (FIG. 5) on one or more drill bit arms 165a-165f.

Figure 9:
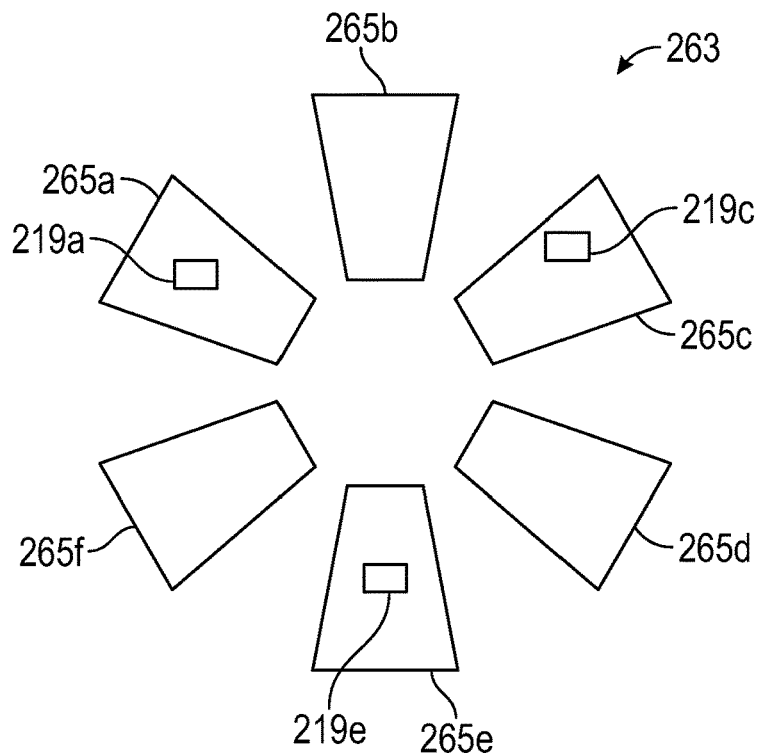
FIG. 9 is a schematic of a drilling tool, according to one or more embodiments.

FIG. 9 depicts a schematic of an embodiment of a drilling tool 45 (FIG. 4) focused on a drill bit 263 viewed from below. Drill bit 263 includes three (3) AE sensors 219a, 219c, 219e and six (6) drill bit arms 265a-265f. AE sensor 219a is located proximate to drill bit arm 265a; AE sensor 219c is located proximate to drill bit arm 265c; and AE sensor 219e is located proximate to drill bit arm 265e. Finally, sensor data signals from each AE sensor 219a, 219c, 219e are communicated to controller 4 (FIG. 4), allowing controller 4 (FIG. 4) to calculate toughness and wear resistance for the cutting element(s) 11 (FIG. 5) of three drill bit arms 265a, 265c, 265e.

In some embodiments, drilling tool 45 (FIG. 4) may include any number of AE sensors 219a, 219c, 219e, any number of AE sensor arrays 25 (FIG. 2), or both. The multiple AE sensors/AE sensor arrays 219a, 219c, 219e, 25 (FIG. 2) may have any arrangement on drilling tool 45 (FIG. 4). In such an embodiment, controller 4 (FIG. 4) may calculate toughness and wear resistance using the data signal from each AE sensor/AE sensor array 219a, 219c, 219e, 25 (FIG. 2). In some embodiments, the calculation results may reflect the toughness and wear resistance for one or more cutting elements 11 (FIG. 5) of one or more drill bit arms 265a-265f. In such an embodiment, multiple AE sensors 219a, 219c, 219e and/or one or more AE sensor arrays 25 (FIG. 2) may be used for triangulation, as discussed further.

Figure 10:
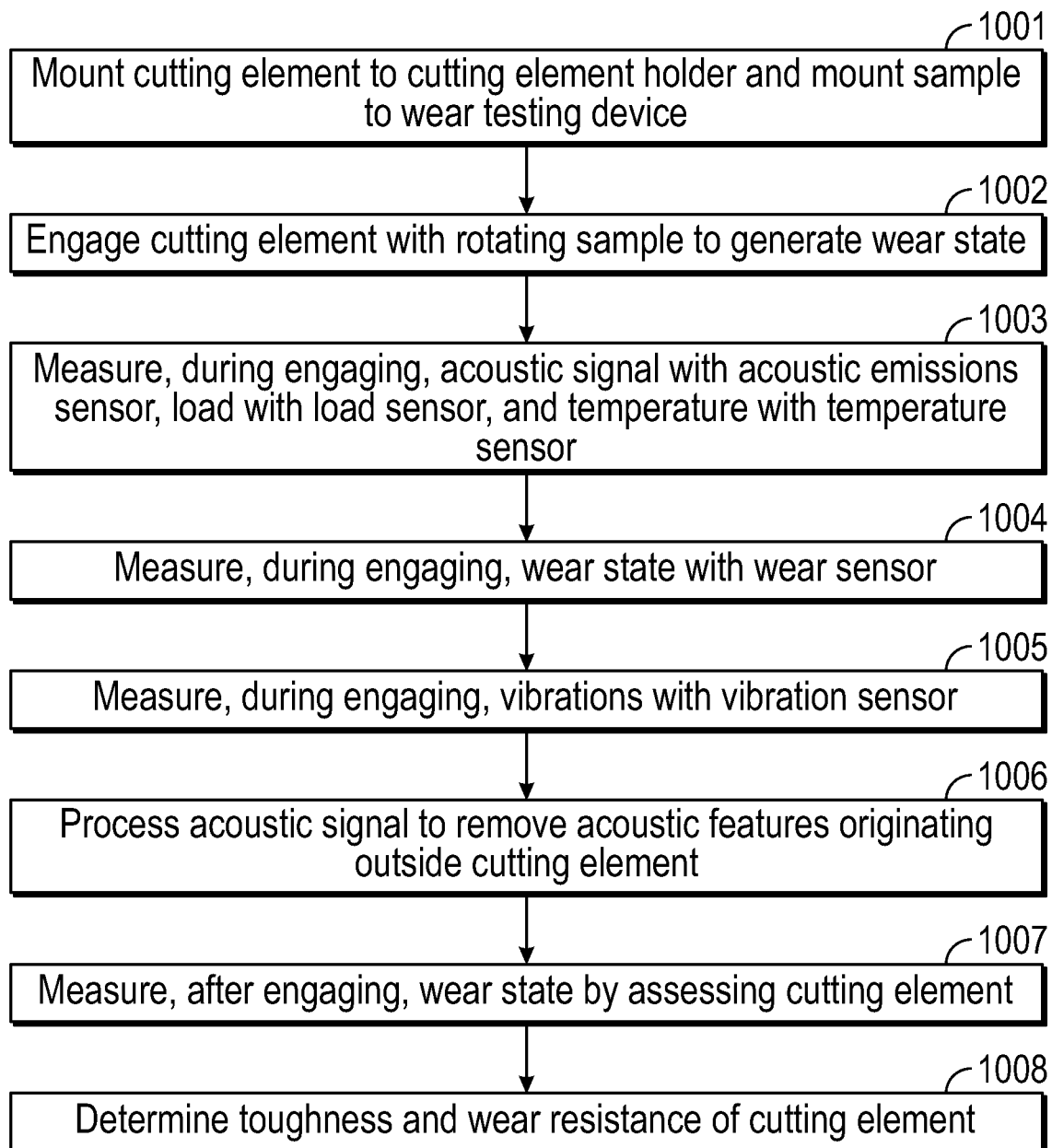
FIG. 10 is a flow chart of a method, according to one or more embodiments.
Figure 11:
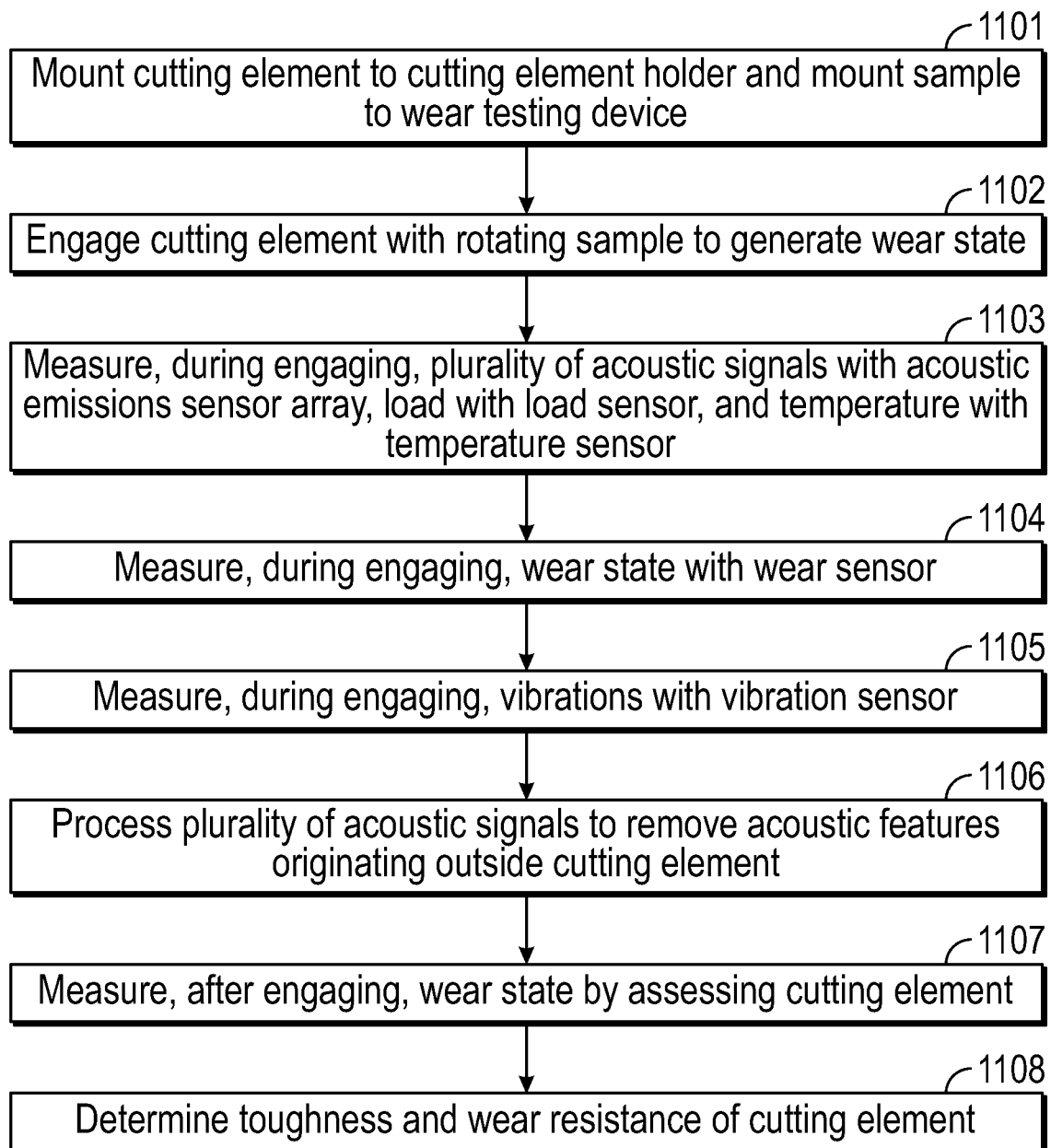
FIG. 11 is a flow chart of a method, according to one or more embodiments.
Figure 12:
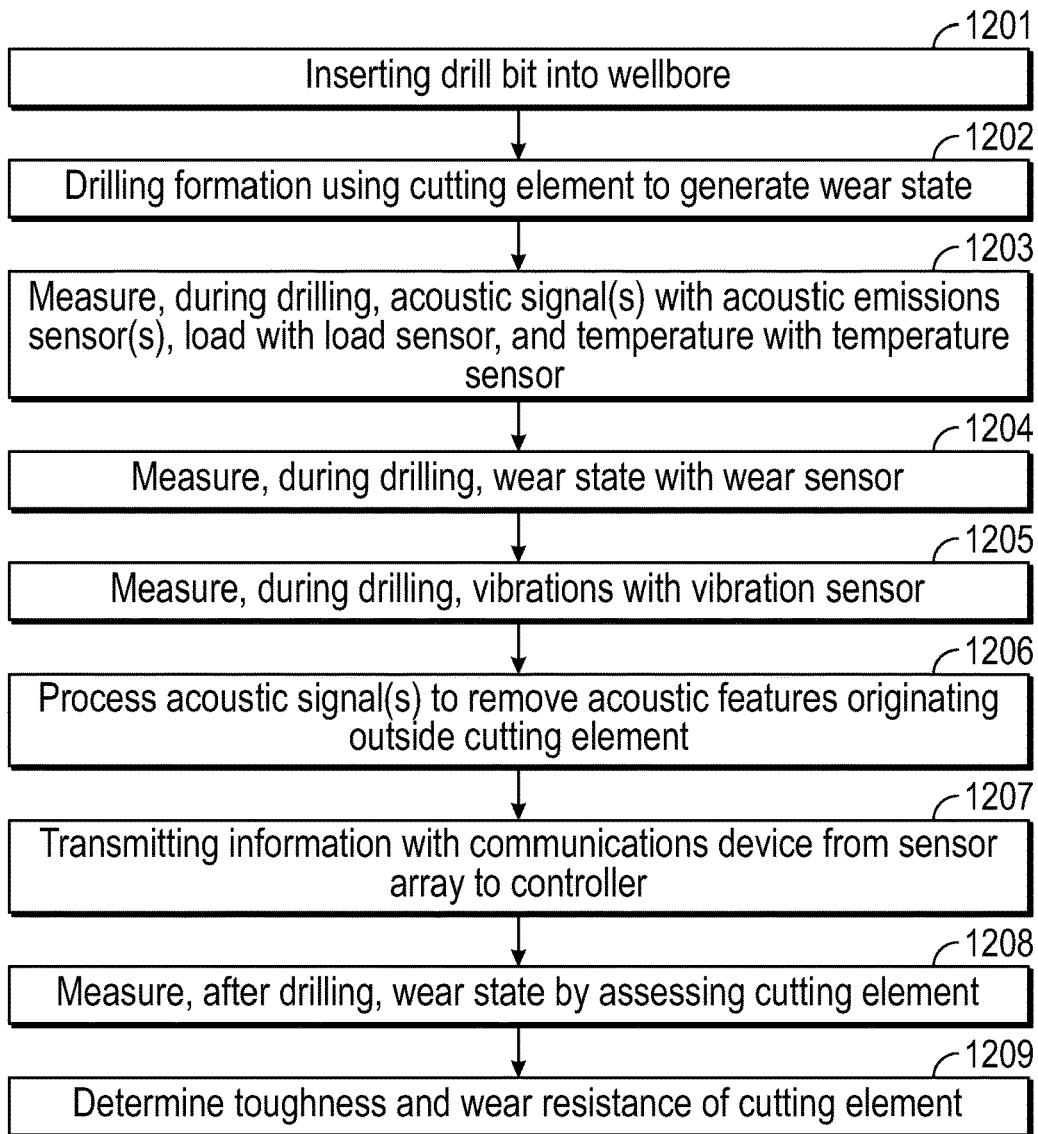
FIG. 12 is a flow chart of a method, according to one or more embodiments.

FIGS. 10-12 are flow charts detailing embodiments of the method of using a testing device 1 (FIGS. 10 and 11) or a drilling tool 45 (FIG. 12) to determine the toughness and the wear resistance of a cutting element 11. Specifically, FIGS. 10 and 11 describe methods for acquiring toughness and wear resistance measurements of a cutting element 11 on a testing device 1 as described in reference to FIGS. 1-3. FIG. 12 describe methods for acquiring toughness and wear resistance measurements of a cutting element 11 on a drilling tool 45 as described in reference to FIGS. 4-9. Further, one or more blocks in FIGS. 10-12 may be performed by one or more components as described in FIG. 13 (e.g., computing device 1300 including computer processor(s) 1302 and communication interface 1312). Some steps may be similar between the methods depicted in FIGS. 10-12, as will be discussed below. While the various blocks in FIGS. 10-12 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

The method of use depicted in FIG. 10 may be applied to embodiments of testing device 1 with a single AE sensor 19, such as depicted in FIG. 1.

Initially, in FIG. 10, Step 1001 involves mounting a cutting element 11 to a cutting element holder 13 of a wear testing device 3 and mounting a sample 7 to a sample rotation element 9 of wear testing device 3.

The specific procedure for Step 1001 may depend upon the configuration and operation of sample 7, sample rotation element 9, cutting element 11, cutting element holder 13, and wear testing device 3. To that end, in some embodiments, mounting cutting element 11 to cutting element holder 13 may include any combination of adhesive(s), clip(s), screw(s), nut(s), bolt(s), or any other fastening mechanism known in the art. Similarly, in some embodiments, mounting sample 7 to sample rotation element 9 may include any combination of adhesive(s), clip(s), screw(s), nut(s), bolt(s), or any other fastening mechanism known in the art.

In some embodiments, mounting cutting element 11 to cutting element holder 13 may be temporary, so as to allow for additional analysis of cutting element 11, replacing cutting element 11 after testing, or some other reason. Alternatively, in some embodiments, cutting element 11 may be permanently mounted to or an integral piece of cutting element holder 13. In some such embodiments, cutting element holder 13 may be removeable from wear testing device 3.

In some embodiments, mounting sample 7 to sample rotation element 9 may be temporary, so as to allow for additional analysis of sample 7, replacing sample 7 after testing, or some other reason.

Step 1002 involves engaging cutting element 11 with sample 7 while sample rotation element 9 rotates sample 7. In Step 1002, engagement of cutting element 11 with sample 7 while sample 7 rotates generates a wear state of cutting element 11. As described above, a wear state is a quantitative metric of the permanent deformation that occurs in cutting element 11 due to engagement with sample 7.

During engagement, sample rotation element 9 rotates sample 7. Also, during engagement, cutting element holder 13 directly or indirectly pushes cutting element 11 into sample 7 with an applied force.

In some embodiments, engagement between cutting element 11 and sample 7 may proceed for a predetermined length. This predetermined length of the engagement may be measured as a duration (measured as time), a groove length (measured as distance), or any other suitable measurement.

In Step 1003, temperature, applied load, and acoustic signal are measured while cutting element 11 is engaged with sample 7.

Step 1003 measures, during engagement, an acoustic signal using an AE sensor 19, an applied load by cutting element 11 on sample 7 using a load sensor 17, and a temperature of cutting element 11 using a temperature sensor 21.

Step 1004 measures, during engagement, a wear state using a wear sensor 23.

In Step 1002, a wear state is generated when engagement between cutting element 11 and sample 7 causes permanent deformation of cutting element 11. In Step 1004, Step 1007, or both, that wear state is measured and quantified. Step 1004 measures the wear state of cutting element 11 in real-time during engagement, while Step 1007 (discussed further) measures the cumulative wear state of cutting element 11 after engagement. A cumulative value for the wear state measured in real time (as in Step 1004) should equal the wear state measured after engagement (as in Step 1007).

Whether measured during engagement (as in Step 1004) or after engagement (as in Step 1007), the wear state may be any metric known in the art to quantitatively define material wear. In some embodiments, the wear state may be equal to the weight or volume loss of cutting element 11 or the weight or volume loss of sample 7. In some embodiments, the wear state may be a wear rate, meaning the volume or weight loss per unit sliding distance or the volume or weight loss per unit applied load. In some embodiments, the wear state may equal the wear coefficient of cutting element 11. This wear coefficient may be a function of the volumetric loss of cutting element 11 (or, relatedly, the weight loss of cutting element 11), the sliding distance of cutting element 11 on sample 7, and the applied load by cutting element 11 on sample 7. Specifically, in some embodiments, the wear coefficient (K) may be calculated as:

$$K = \frac{3HV}{PL}$$

where H is the Brinell hardness of cutting element 11, V is the volumetric loss, P is the applied load, and L is the sliding distance.

In some embodiments, measuring the wear state of cutting element 11 may include measuring the (instant or cumulative) volume or weight loss of cutting element 11. In some embodiments, wear sensor 23 may be an image capture device, such as a digital video camera, a digital still camera, or a CCD camera attached to an optical microscope. Thus, in some embodiments, measuring the wear state may include analyzing images of cutting element 11 during engagement to quantify changes in cutting element 11 shape, size, or both due to plastic deformation and fracture. The volume or weight loss of cutting element 11 may then be determined by analyzing images, in some embodiments. Such image analysis may be performed during engagement as in Step 1004, so as to enable real-time measurement of the wear state.

In some embodiments, measuring the wear state of cutting element 11 may include measuring the sliding distance of cutting element 11 on sample 7. Such measurements may be performed by digitally analyzing images taken during engagement by wear sensor 23; by analyzing the groves formed in sample 7 after engagement; by geometric calculation using measurements taken during engagement (for example, using sample 7 rotation speed, sample 7 geometry, engagement duration, and cutting element 11 location); or any other method known in the art. Determining the sliding distance may be performed during engagement, so as to enable real-time measurement of the wear state.

In some embodiments, measuring the wear state of cutting element 11 may include measuring the applied load with load sensor 17.

In some embodiments, measuring the wear state of cutting element 11 may include analyzing images of the microstructure of cutting element 11 such as may be imaged with polarized light.

Step 1005 measures, during engagement, vibrations using a vibration sensor 15.

Step 1006 processes the acoustic signal to remove acoustic features originating outside cutting element 11.

Step 1006 may include applying one or more signal processing methods to determine the origin of a particular acoustic feature within the measured acoustic signal, such as frequency analysis, noise removal, or both. In some embodiments, the origin for a given acoustic feature of the acoustic signal may be determined by controller 4. The acoustic features originating outside of cutting element 11 may include acoustic features originating in sample 7 or background noises, such as ambient noises from the environment, machinery noises of testing device 1, or sounds associated with flowing and pumping cutting fluid. After an origin is determined, controller 4 may apply one or more signal processing methods to the acoustic signal to remove acoustic features originating outside cutting element 11. In some embodiments, multiple signal processing methods may be applied in parallel or in series to improve the accuracy of the results.

While cutting element 11 and sample 7 may both be formed of hard and brittle materials, they may be formed of different materials. Thus, the irreversible changes of cutting element 11 and of sample 7 may create acoustic features having different frequencies, potentially making it possible to correlate a particular frequency range with a particular origin. In some embodiments, a Fast Fourier transform (FFT) and Inverse FFT (IFFT) may be performed to transform the acoustic signal from the time domain to the frequency domain. In the frequency domain, acoustic features generated by different phenomena (e.g., background noise, fracture of sample 7, and fracture of cutting element 11) may be differentiated by analyzing the frequency and amplitude. Consequently, in some embodiments, it may be possible to divide the acoustic frequency spectrum into multiple frequency ranges, where each frequency range indicates a different origin.

While AEs have been reported at higher and lower frequencies, most AEs release acoustic energy in a range of 1 kHz to 1 MHz. Thus, as a simplified, illustrative example, "high frequency" acoustic features (above 1 MHz) may be attributable to background noise, "middle frequency" acoustic features (within the range of 1 kHz to 1 MHz) may be attributable to AE originating within cutting element 11, and "low frequency" acoustic features (below 1 kHz) may be attributable to sounds originating within sample 7. In such a system, since only "middle frequency" acoustic features originate in cutting element 11, controller 4 may filter the acoustic signal to remove acoustic features outside of the "middle frequency" range.

Multiple phenomena may generate acoustic features in overlapping frequency ranges. Consequently, in some embodiments, signal deconvolution or other acoustic signal processing methods may be used to separate acoustic features within a single frequency range that have different origins or are generated by different phenomena.

A person having ordinary skill in the art will appreciate that the frequency of the AEs generated in cutting element 11 may depend upon the composition of cutting element 11 and the microstructural mechanisms that occur. Similarly, AEs may be generated within sample 7 in a frequency range dependent upon the composition of sample 7 and the microstructural mechanisms that occur. Thus, because the range of frequencies included or excluded may depend upon the particulars of the system, the frequency ranges included/excluded may vary from the above example.

In some embodiments of Step 1006, the vibrations measured with vibration sensor 15 may be used to remove acoustic features originating outside cutting element 11.

In some embodiments, vibration sensor 15 may detect vibrations generated by one or more processes during a test. These vibrations may then be used to remove acoustic features originating outside cutting element 11. As an illustrative example, consider the vibrations generated by a motorized component of wear testing device 3, such as sample rotation element 9. The motor within sample rotation element 9 may simultaneously release both mechanical energy (in the form of mechanical vibrations) and acoustic energy (in the form of background noise). Vibration sensor 15 may detect the mechanical vibrations of sample rotation element 9. Additionally, since the motor of sample rotation element 9 simultaneously released mechanical vibrations and background noise, the mechanical vibrations that are detected may correlate to the background noise released by sample rotation element 9.

Furthermore, some acoustic sensors use the displacement of a mechanical component, such as a diaphragm, to measure acoustic waves. Thus, the mechanical vibrations generated by sample rotation element 9 may physically vibrate AE sensor 19, which may be interpreted by AE sensor 19 as an acoustic feature. Consequently, in some embodiments, the vibrations detected by vibration sensor 15 may be used to remove acoustic features originating outside cutting element 11.

In some embodiments, other transformation methods (e.g., Hartley, Hankel, Laplace, etc.) may be applied to the acoustic signal to differentiate between different phenomena so that any acoustic features originating outside cutting element 11 may be removed from the acoustic signal. In some embodiments, additional signal processing techniques known in the art may also be used to process the acoustic signal. Such additional transformation methods, signal processing techniques, or both may occur before or after frequency analysis or triangulation.

Step 1007 measures, after engagement, a wear state by assessing cutting element 11. Some embodiments of the method may not include Step 1007, such as those applied to sensor array 5 that includes wear sensor 23. Alternatively, in some embodiments, wear state may be assessed both during engagement with wear sensor 23 as in Step 1004 and after engagement as in Step 1007.

In some embodiments, measuring the wear state after engagement may include comparing the weight or volume of cutting element 11 before and after engagement. In some embodiments, measuring the wear state after engagement may include imaging the cutting element 11 before engagement, after engagement, or both. Alternatively, in some embodiments, image analysis by comparing images of cutting element 11 taken before and after engagement may be used to quantify changes in cutting element 11 shape, size, or both, which may occur due to plastic deformation or fracture.

In some embodiments, measuring the wear state of cutting element 11 may include measuring the total sliding distance of cutting element 11 on sample 7. Such measurements may be performed by comparing images taken before and after engagement; by physically measuring the length of the grove in sample 7 after engagement; by geometric calculation using measurements taken during engagement (for example, using sample 7 rotation speed, sample 7 geometry, engagement duration, and cutting element 11 location); or any other method known in the art.

In some embodiments, measuring the wear state of cutting element 11 may include measuring the applied load with load sensor 17.

In some embodiments, measuring the wear state of cutting element 11 may include comparing images of the microstructure of cutting element 11 taken before and after engagement. Such microstructural images may be captured using any technique known in the art, including polarized light microscopy or scanning electron microscopy.

Step 1008 determines the toughness and the wear resistance of cutting element 11. Any measurements made before, during, or after engagement may be factors in the toughness, the wear resistance, or both.

In some embodiments of Step 1008, the toughness, the wear resistance, or both may depend on the wear state, the applied load, the temperature, the acoustic signal, or a combination. The wear state may be determined as discussed previously in Step 1004, Step 1007, or both. The applied load, the temperature, and the acoustic signal may be measured as discussed previously in Step 1003. Prior to calculating the toughness and wear resistance, the acoustic signal may be processed as discussed previously in Step 1006.

The wear resistance of cutting element 11 may be defined by any property that quantitatively describes a resistance to the change of the wear state of cutting element 11. The wear resistance of cutting element 11 may depend upon the volume loss of sample 7 and the volume loss of cutting element 11. More specifically, in some embodiments, the wear resistance of cutting element 11 may equal the volume loss of sample 7 divided by the volume loss of cutting element 11. Alternately, the wear resistance of cutting element 11 may equal the weight loss of cutting element 11 or may equal the sliding distance in sample 7 caused by cutting element 11.

The toughness of a material is the quantity of energy per unit volume that can be absorbed before failure. In some embodiments, toughness of cutting element 11 may depend on the acoustic signal, the temperature, and the applied load.

More specifically, the toughness of a cutting element 11 may be related to the microstructural changes like dislocation formation or twinning included in the acoustic signal generated by the AE sensor 19. Therefore, each AE feature generated within cutting element 11 is indicative of the toughness of cutting element 11 under the applied load during a wear test.

In one or more embodiments, the toughness of cutting element 11 may be determined by plotting a curve of the amplitude of the acoustic signal as a function of time and determining an area under the curve in a plot of the acoustic signal vs. time.

In some embodiments, prior to calculating the toughness, acoustic signals originating outside of cutting element 11 may be removed from the acoustic signal (as in Step 1006).

In some embodiments, it may be important to accurately know the materials composition of cutting element 11 in order to calculate the wear resistance, the toughness, or both. Knowing the correct materials composition may be important when including one or more intrinsic materials properties (for example, density, hardness, or elastic modulus) in a calculation. For example, as shown above, the Brinell hardness and potentially the density of the material that composes cutting element 11 may be required to calculate the wear state of cutting element 11. Therefore, it may be important to ensure no unintentional or undesirable phase transformations of cutting element 11 have occurred during a wear test, such as by monitoring the temperature.

Furthermore, in some embodiments, a toughness calculated from AEs may be less accurate or invalid for a cutting element 11 formed of an anisotropic material. More specifically, the propagation of the acoustic wave within cutting element 11 may be impacted by the arrangement and bonding of the atoms within the cutting element's 11 one or more materials properties, for example crystallography, defect density, or the spatial distribution of detects. Within a cutting element 11 formed of an isotropic material, an acoustic wave generated by some process may propagate isotropically. However, in a cutting element 11 formed of an anisotropic material, an acoustic wave generated by a similar/identical process may propagate differently depending upon the propagation direction within cutting element 11. Therefore, on detection by AE sensor 19, one or more aspects (for example, the frequency, wavelength, propagation velocity, time-period, or amplitude) of a given acoustic wave may vary depending upon the location of AE sensor 19 (which defines the propagation direction between the original source of the acoustic wave and AE sensor 19). In the extreme, such anisotropy may render an acoustic wave undetectable or otherwise unusable in one or more directions. For example, the acoustic wave amplitude within some materials may rapidly decay to zero in certain propagation directions due to the weak inter-layer bonding, such as perpendicular to the in-plane direction of graphite.

It may be possible to properly calculate the wear resistance, toughness, or both of a cutting element 11 formed from a particular anisotropic material. However, it may again be important to ensure no unintentional or undesirable phase transformations of cutting element 11 have occurred during a wear test, such as by monitoring the temperature.

In some embodiments of Step 1008, temperature sensor 21 may be used to monitor the temperature of cutting element 11 during a wear test. Temperature monitoring with temperature sensor 21 may be used to confirm the material composition of cutting element 11, for example by monitoring for temperatures that might facilitate unwanted or unintentional phase transformations of cutting element 11. In one illustrative example, temperature sensor 21 may be used to ensure a PDC drill bit does not phase transform into graphite during a wear test by confirming the temperature stays below approximately 700° C. (1300° F.).

In some embodiments of Step 1008, the toughness, the wear resistance, or both may be determined in real-time during a test. Such real-time determination may require real time determination of the wear state, as previously discussed in Step 1004.

The method of use depicted in FIG. 11 may be applied to embodiments of testing device 1 with an AE sensor array 25 having a plurality of AE sensors 19, such as depicted in FIGS. 2 and 3. Some steps in the method of use for testing device 1 having an AE sensor array 25 (as in FIG. 11) may be similar to the method of use for testing device 1 having one AE sensor 19 as previously discussed in reference to FIG. 10.

In Step 1101, a cutting element 11 is mounted to a cutting element holder 13 of a wear testing device 3 and mounting a sample 7 to a sample rotation element 9 of wear testing device 3. Step 1101 may be similar to Step 1001 discussed previously.

In Step 1102, cutting element 11 is engaged with sample 7 while a sample rotation element 9 rotates sample 7. Step 1102 may be similar to Step 1002 discussed previously.

In Step 1103, during engagement, a plurality of acoustic signals are measured using AE sensor array 25 (formed of a plurality of AE sensors 19), an applied load by cutting element 11 on sample 7 is measured using a load sensor 17, and a temperature of cutting element 11 is measured using a temperature sensor 21.

To detect AEs, Step 1103 includes measuring a plurality of acoustic signals using AE sensor array 25. The measurement of an acoustic signal by each of the plurality of AE sensors 19 within AE sensor array 25 may be similar to Step 1003 discussed previously. The temperature and applied load measurements in Step 1103 may be similar to Step 1003 discussed previously.

In Step 1104, a wear state is measured using a wear sensor 23 during engagement. Step 1104 may be similar to Step 1004 discussed previously.

In Step 1105, vibrations are measured using a vibration sensor 15 during engagement. Step 1105 may be similar to Step 1005 discussed previously.

In Step 1106, a plurality of acoustic signals is processed to remove acoustic features originating outside cutting element 11. Step 1106 may include any combination of signal processing methods, including those discussed in Step 1006 previously.

Additionally, in some embodiments, Step 1106 may include triangulation to determine the origin of each acoustic feature. Given the fixed speed of sound in a medium, the elapsed time between generation and detected of an acoustic feature by AE sensor 19 depends upon the distance between the origin of that acoustic feature and AE sensor 19. Therefore, in an embodiment with multiple AE sensors 19, the elapsed time between generation and detection may vary between the AE sensors 19. In some embodiments, by applying the above principal to sensor array 5 having multiple AE sensors 19 measuring multiple acoustic signals, controller 4 may use acoustic triangulation to determine an origin for each acoustic feature in the acoustic signals.

A minimum of three AE sensors 19 may be required for triangulation in three dimensions. Some embodiments may employ more than three AE sensors 19, for example to provide redundancy or to increase triangulation accuracy. Thus, some embodiments may employ more than three AE sensors 19, such as the nine AE sensors 19 in AE sensor array 25 of FIGS. 2 and 3. In some embodiments, two AE sensors 19 may similarly be used for triangulation in two spatial dimensions.

In some embodiments, each of the plurality of acoustic signals may be processed individually. In some embodiments, two or more of the plurality of acoustic signals may be processed in combination, such as is required for triangulation.

In Step 1107, a wear state is measured by assessing cutting element 11 after engagement. Step 1107 may be similar to Step 1007 discussed previously.

In Step 1108, the toughness and the wear resistance of cutting element 11 are determined. Step 1108 may be similar to Step 1008 discussed previously except calculating the toughness and the wear resistance according to Step 1108 includes multiple acoustic signals. Any measurements made before, during, or after engagement may be factors in the toughness, the wear resistance, or both.

In some embodiments of Step 1108, the toughness and the wear resistance may depend on the wear state, the applied load, the temperature, the acoustic signals, or a combination. The wear state may be determined as discussed previously in Step 1104, Step 1107, or both. The applied load, the temperature, and the acoustic signals may be measured as discussed previously in Step 1103. Prior to calculating the toughness and wear resistance, the acoustic signals may be processed as discussed previously in Step 1106.

In one or more embodiments of Step 1108, the toughness of cutting element 11 may be determined by plotting a plurality of acoustic signal vs. time curves where each curve plots the amplitude of one of the plurality of acoustic signals as a function of time, determining a plurality of areas under a plurality of curves, where each of the curves is a plot of one of the plurality of acoustic signals vs. time, and determining the toughness from the plurality of areas.

In some embodiments, a single value may describe the toughness of cutting element 11. Determining a single value for the toughness of cutting element 11 from the plurality of acoustic signals may involve determining the mean, the mode, the median, or some other statistical metric from the plurality of areas.

In some embodiments, the toughness of cutting element 11 may include multiple toughness values, for example multiple toughness values each referring to a particular region of cutting element 11.

Because the toughness of cutting element 11 may depend upon the direction, the toughness may be written in tensor form to describe the material anisotropy of cutting element 11.

In some embodiments of Step 1108, the toughness, the wear resistance, or both may be determined in real-time during a test. Such real-time determination may require real time determination of the wear state, as previously discussed in Step 1104.

The method depicted in FIG. 12 may be applied to embodiments of a drilling tool 45, such as those depicted in any of FIGS. 4-9.

In Step 1201, a drill bit 63 of drilling tool 45 is inserted into a wellbore 47.

In Step 1202, cutting element 11 of drill bit 63 drills wellbore 47 into a formation 53. This drilling generates a wear state of the cutting element 11.

In Step 1203, temperature, applied load, and acoustic signal(s) are measured while cutting element 11 is drilling into formation 53. Step 1203 may be similar to Steps 1003 and 1103 discussed previously.

As in Steps 1003 and 1103 discussed previously, a temperature of cutting element 11 may be measured with a temperature sensor 21 and an applied load by cutting element 11 on formation 53 may be measured using a load sensor 17.

Some embodiments of the method may include measuring a single acoustic signal similar to Step 1003 discussed previously, such as those applied to embodiments of drilling tool 45 with a single AE sensor 19 (as in FIGS. 1 and 5-7).

Some embodiments of the method may include measuring a plurality of acoustic signals similar to Step 1103 discussed previously, such as those applied to embodiments of drilling tool 45 with a plurality of isolated AE sensors 19 (as in FIG. 9), a plurality of AE sensors 19 within one AE sensor array 25 (as in FIGS. 2 and 3), a plurality of AE sensors 19 within multiple sensor arrays 5 (as in FIG. 8), or a combination.

In Step 1204, a wear state is measured using a wear sensor 23 during drilling. Step 1204 may be similar to Step 1004 discussed previously, except references to sample 7 are replaced with formation 53.

In Step 1205, vibrations are measured using a vibration sensor 15 during drilling. Step 1205 may be similar to Step 1005 discussed previously.

In Step 1206, the acoustic signal(s) are processed to remove acoustic features originating outside cutting element 11. Step 1206 may be similar to Steps 1006, 1106, or both discussed previously, except references to sample 7 are replaced with formation 53 and references to testing device 1 are replaced with drilling tool 45.

In Step 1207, information is transmitted with a communication device 67 in real-time from sensor array 5 performing the measuring in wellbore 47 to a controller 4 performing the determining above a surface 51.

Some embodiments of the method may include using communication device 67 to transmit information from sensor array 5 to controller 4. Furthermore, in some embodiments, information may also be transmitted in the reverse direction, meaning from controller 4 to sensor array 5.

In Step 1208, a wear state is measured by analyzing cutting element 11 after drilling. Step 1208 may be similar to Step 1007 discussed previously. In some embodiments, Step 1208 may be performed after drill bit 63 is removed from wellbore 47.

In Step 1209, the toughness and the wear resistance of one or more cutting elements 11 are determined. Any measurements made before, during, or after engagement may be factors in the toughness, the wear resistance, or both. Step 1208 may be similar to Step 1008 or Step 1108 discussed previously.

Embodiments disclosed herein may be implemented on a computing device such as that shown in FIG. 13. Any combination of mobile, desktop, server, router, switch, embedded device, or other types of hardware may be used. For example, as shown in FIG. 13, computing device 1300 may include one or more computer processors 1302, non-persistent storage 1304 (e.g., volatile memory, such as random access memory (RAM), cache memory), persistent storage 1306 (e.g., a hard disk, an optical drive such as a compact disk (CD) drive or digital versatile disk (DVD) drive, a flash memory, etc.), a communication interface 1312 (e.g., Bluetooth interface, infrared interface, network interface, optical interface, etc.), and numerous other elements and functionalities.

Computer processor(s) 1302 may be an integrated circuit for processing instructions. For example, the computer processor(s) may be one or more cores or micro-cores of a processor. Computing device 1300 may also include one or more input devices 1310, such as a touchscreen, keyboard, mouse, microphone, touchpad, electronic pen, or any other type of input device. In one or more embodiments, computer processor(s) 1302 may be included in one or more of controller 4, communication device 67, or sensor array 5 as described in FIGS. 1-7 and the accompanying descriptions.

Communication interface 1312 may include an integrated circuit for connecting the computing device 1300 to a network (not shown) (e.g., a local area network (LAN), a wide area network (WAN) such as the Internet, mobile network, or any other type of network) and/or to another device, such as another computing device.

Further, computing device 1300 may include one or more output devices 1308, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) 1302, non-persistent storage 1304, and persistent storage 1306. Many different types of computing devices exist, and the aforementioned input and output device(s) may take other forms. In one or more embodiments, the one or more output devices 1308 may be included in controller 4 to output the near-real-time sample toughness and wear resistance information, as described in FIGS. 1-4 and 7 and the accompanying descriptions.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Computing device 1300 in FIG. 13 may be connected to or include a computer that further comprises one or more of sensor array 5, controller 4, or communication device 67, as described in FIGS. 1-7 and the accompanying description.

The computing device of FIG. 13 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing device. For example, data may be presented to a user using a vibration generated by a handheld computer device with a predefined duration and intensity of the vibration to communicate the data.

The above description of functions presents only a few examples of functions performed by the computing device of FIG. 13. Other functions may be performed using one or more embodiments of the disclosure.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A drilling tool for drilling a wellbore in a formation, comprising:
    a drill bit comprising a cutting element;
    a sensor array comprising:
        an acoustic emissions (AE) sensor configured to measure an acoustic signal generated during drilling of the formation by the cutting element; and
        a load sensor configured to measure an applied load by the cutting element on the formation; and
    a controller communicably connected to the sensor array and configured to determine a toughness of the cutting element using the acoustic signal, the applied load, and a wear state.

2. The drilling tool of claim 1, wherein
    the sensor array further comprises an AE sensor array comprised of a plurality of AE sensors communicably connected to the controller, and
    the plurality of the AE sensors are configured to measure a plurality of the acoustic signals generated during the drilling.

3. The drilling tool of claim 2,
    wherein each of the plurality of the acoustic signals are preprocessed using a preamplifier, a filter, and an amplifier communicably connected between each of the plurality of AE sensors and the controller.

4. The drilling tool of claim 2,
    wherein the AE sensor array is configured to triangulate an origin for each acoustic feature generated during the drilling.

5. The drilling tool of claim 1, wherein
    the sensor array further comprises a wear sensor configured to measure the wear state of the cutting element during the drilling, and
    the wear sensor is an image capture device.

6. The drilling tool of claim 1, wherein the sensor array further comprises a vibration sensor communicably connected to the controller and configured to measure vibrations of the cutting element during the drilling.

7. The drilling tool of claim 1, wherein at least one sensor of the sensor array is embedded in the drill bit.

8. The drilling tool of claim 1, further comprising a plurality of the sensor arrays, wherein
    the drill bit is comprised of a plurality of drill bit arms, each of the drill bit arms having at least one of the cutting element, and
    a fraction of the plurality of drill bit arms are each monitored by one of the sensor arrays.

9. The drilling tool of claim 1, wherein
    the drill bit is comprised of a plurality of drill bit arms, each of the drill bit arms having at least one of the cutting element,
    the sensor array further comprises a plurality of the AE sensors, and
    a fraction of the plurality of drill bit arms are each monitored by one of the AE sensors.

10. The drilling tool of claim 1, wherein the sensor array further comprises a temperature sensor communicably connected to the controller and configured to measure a temperature of the cutting element during the drilling.

11. A method for characterizing a cutting element of a drill bit while drilling a well bore in a formation, the method comprising:
    inserting the drill bit into the wellbore;
    drilling the formation using the cutting element, generating a wear state of the cutting element;
    measuring, during the drilling, an acoustic signal using an AE sensor and an applied load by the cutting element on the formation using a load sensor; and
    determining a toughness and a wear resistance of the cutting element using the acoustic signal, the applied load, and a wear state of the cutting element.

12. The method of claim 11, further comprising:
    measuring, during the drilling, the wear state of the cutting element using a wear sensor,
    wherein the toughness and the wear resistance of the cutting element are determined in real-time during the drilling.

13. The method of claim 11, further comprising:
    processing the acoustic signal to remove acoustic features originating outside of the cutting element,
    wherein the acoustic features originating outside of the cutting element comprise background noise and acoustic features originating in the formation.

14. The method of claim 11, wherein
    measuring further comprises measuring a plurality of the acoustic signals using an AE sensor array comprising a plurality of the AE sensors, and
    determining the toughness and the wear resistance further comprises determining the toughness and the wear resistance of the cutting element using the plurality of the acoustic signals.

15. The method of claim 14, further comprising:
    processing the plurality of acoustic signals to remove acoustic features originating outside of the cutting element, the processing comprising:
        triangulating an origin for each of the acoustic features generated during the drilling; and
        removing the acoustic features where the origin is not within the cutting element.

16. The method of claim 11, further comprising:
    measuring, during the drilling, vibrations of the cutting element using a vibration sensor, wherein the processing the plurality of acoustic signals further uses the vibration.

17. The method of claim 11, further comprising:

transmitting information with a communication device in real-time from a sensor array performing the measuring in the wellbore to a controller performing the determining above a surface, wherein the sensor array comprises the AE sensor, the load sensor, and the wear sensor.

18. The method of claim 11, wherein measuring and determining the toughness and the wear resistance of the cutting element are performed for each of a fraction of drill bit arms within the drill bit.

19. The method of claim 11, further comprising:

determining an area under a curve in a plot of the acoustic signal vs. time.

20. The method of claim 11, further comprising:

measuring, during the drilling, a temperature of the cutting element by a temperature sensor, wherein determining the toughness and the wear resistance further comprises monitoring for a phase transformation of the cutting element using the temperature.

\* \* \* \* \*